(12) United States Patent
Han et al.

(10) Patent No.: US 11,693,525 B2
(45) Date of Patent: Jul. 4, 2023

(54) TOUCH DISPLAY DEVICE

(71) Applicant: LG Display Co., Ltd., Seoul (KR)

(72) Inventors: Jonghyun Han, Paju-si (KR); Youngsoo Lee, Paju-si (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

(21) Appl. No.: 17/493,493

(22) Filed: Oct. 4, 2021

(65) Prior Publication Data

US 2022/0171499 A1 Jun. 2, 2022

(30) Foreign Application Priority Data

Dec. 1, 2020 (KR) .................. 10-2020-0165756

(51) Int. Cl.
*G06F 3/044* (2006.01)
*G06F 3/041* (2006.01)

(52) U.S. Cl.
CPC ........ *G06F 3/0446* (2019.05); *G06F 3/04164* (2019.05); *G06F 2203/04112* (2013.01)

(58) Field of Classification Search
CPC ............... G06F 3/0446; G06F 3/04164; G06F 2203/04112
USPC ........................................................ 345/174
See application file for complete search history.

(56) References Cited

U.S. PATENT DOCUMENTS

| | | | | |
|---|---|---|---|---|
| 2010/0328268 A1* | 12/2010 | Teranishi | ............ | G06F 3/04166 345/175 |
| 2019/0004638 A1* | 1/2019 | Lee | ......... | G06F 3/0443 |
| 2019/0064960 A1* | 2/2019 | Na | ......... | G06F 3/0412 |
| 2019/0339818 A1* | 11/2019 | Rhe | ...... | G06F 3/04164 |
| 2020/0103994 A1* | 4/2020 | Vaze | ......... | G06F 3/044 |
| 2021/0026498 A1* | 1/2021 | Moy | ...... | G06F 3/0445 |

* cited by examiner

*Primary Examiner* — Mark Edwards
(74) *Attorney, Agent, or Firm* — Birch, Stewart, Kolasch & Birch, LLP

(57) ABSTRACT

Embodiments of the present disclosure provide a touch display device. A body portion and a wing portion of a touch electrode are formed by cutting the electrode metal along the direction in which the electrode metal is arranged. The body portion, the wing portion and a dummy metal located therein are irregularly formed, so that it is possible to improve the performance of touch sensing and improve the visibility of the electrode metal. In addition, in the case of a large-area touch display device, by dividing the touch electrode line and forming a cutting pattern corresponding to the divided boundary of the touch electrode line inside the touch electrode line, it is possible to prevent the divided boundary of the touch electrode line from being recognized and reduce a load on the touch electrode line, thereby improving the performance of touch sensing.

23 Claims, 20 Drawing Sheets

FIG.20
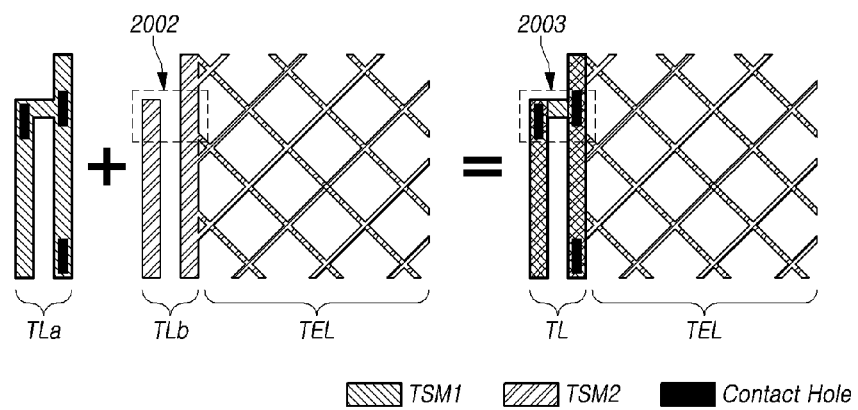
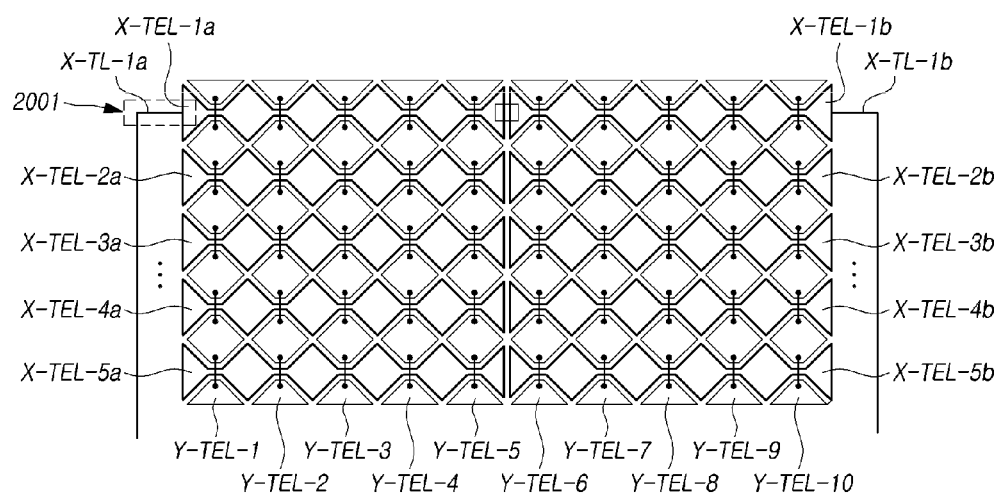

TOUCH DISPLAY DEVICE

CROSS REFERENCE TO RELATED APPLICATION

This application claims priority to Korean Patent Application No. 10-2020-0165756, filed in the Republic of Korea on Dec. 1, 2020, the entire contents of which are hereby expressly incorporated by reference for all purposes as if fully set forth herein into the present application.

BACKGROUND

Field

Embodiments of the present disclosure are related to a touch display device.

Description of Related Art

The growth of the information society leads to increased demand for display devices to display images and use of various types of display devices, such as liquid crystal display devices, organic light emitting display devices, etc.

The display devices, for providing various functions to a user, provide a function that recognizes a touch by a finger or a pen of the user contacting the display panel and performs an input process based on the recognized touch.

The display devices can comprise a plurality of touch electrodes disposed on the display panel, or imbedded in the display panel. And the display devices can sense a touch of the user to the display panel by detecting a change of a capacitance occurred by the touch of the user.

As the touch electrode is disposed on the display panel, there can be provided various functions to the user through touch sensing, but there is a limitation that the touch electrode may be visually recognized by the user. In that case, the display quality can be deteriorated due to the touch electrode being visually recognized by the user.

Accordingly, there is a demand for a method for preventing the touch electrode from being visually recognized by the user and arranging the touch electrode on the display panel.

SUMMARY OF THE DISCLOSURE

Embodiments of the present disclosure provide a method for disposing a touch electrode on a display panel while reducing or preventing a phenomenon in which the touch electrode disposed on the display panel is visually recognized from the outside.

Embodiments of the present disclosure provide a method for improving touch sensing performance in a display panel in which a touch sensing function is implemented by using a touch electrode having a form with improved visibility In one aspect, embodiments of the present disclosure can provide a touch display device including a plurality of X-touch electrode lines disposed on an encapsulation layer located in an active area and including a plurality of X-touch electrodes, where at least two or more X-touch electrodes are disposed adjacent to each other along a first direction among the plurality of X-touch electrodes being electrically connected to each other; and a plurality of Y-touch electrode lines disposed on the encapsulation layer and including a plurality of Y-touch electrodes, where at least two or more Y-touch electrodes are disposed adjacent to each other along a second direction intersecting the first direction among the plurality of Y-touch electrodes being electrically connected to each other.

At least one touch electrode of the plurality of X-touch electrode and the plurality of Y-touch electrode can include at least one body portion and a plurality of wing portions electrically connected to the at least one body portion.

At least two of the plurality of wing portions can have different lengths.

At least one wing portion of the plurality of wing portions can include a first portion having a first width, a second portion having a second width different from the first width, a first dummy area having a first shape and including at least one first dummy metal disposed thereon, and a second dummy area having a second shape different from the first shape and including at least one second dummy metal disposed thereon.

In another aspect, embodiments of the present disclosure can provide a touch display device including a plurality of X-touch electrode lines disposed on an encapsulation layer located in an active area and including a plurality of X-touch electrodes, where at least two or more X-touch electrodes disposed adjacent to each other along a first direction among the plurality of X-touch electrodes being electrically connected to each other; and a plurality of Y-touch electrode lines disposed on the encapsulation layer and including a plurality of Y-touch electrodes, where at least two or more Y-touch electrodes disposed adjacent to each other along a second direction intersecting the first direction among the plurality of Y-touch electrodes being electrically connected to each other, wherein at least one touch electrode line of the plurality of X-touch electrode lines and the plurality of Y-touch electrode lines includes a first electrode line portion and a second electrode line portion separated from the first electrode line portion. The touch display device can further include a plurality of cutting patterns corresponding to a portion of a boundary between the first electrode line portion and the second electrode line portion and shorter than the portion of the corresponding boundary.

The touch display device can further include a plurality of touch routing lines electrically connected to at least one of the plurality of X-touch electrode lines and the plurality of Y-touch electrode lines.

A touch routing line electrically connected to the first electrode line portion among the plurality of touch routing lines can be different from a touch routing line electrically connected to the second electrode line portion among the plurality of touch routing lines.

At least one touch routing line among the plurality of touch routing lines can include a first routing line portion disposed on a layer different from a layer on which the touch electrode line is disposed, and electrically connected to the touch electrode line, and a second routing line portion disposed on the same layer as a layer on which the touch electrode line is disposed, at least a portion of which is separated from the touch electrode line, and electrically connected to the first routing line portion.

According to embodiments of the present disclosure, an irregular pattern or a regular pattern is formed according to the shape of a touch electrode disposed on the display panel, so that it is possible to improve the phenomenon that the touch electrode is visually recognized from the outside.

According to embodiments of the present disclosure, a dummy metal irregularly formed is disposed inside the touch electrode, so that it is possible to improve the visibility of the touch electrode so as to improve touch sensing performance.

According to embodiments of the present disclosure, a touch electrode line is divided along a cutting pattern regularly formed inside the touch electrode, so that it is possible to prevent the divided portion of the touch electrode line from being visually recognized, thereby reducing the load on the touch electrode line so as to improve touch sensing performance.

BRIEF DESCRIPTION OF THE DRAWINGS

The above and other objects, features, and advantages of the present disclosure will be more clearly understood from the following detailed description, taken in conjunction with the accompanying drawings, in which:

FIG. 20 is a diagram illustrating an example of the structure of a touch routing line disposed on a display panel according to embodiments of the present disclosure.

DETAILED DESCRIPTION OF THE EMBODIMENTS

Figure 1:
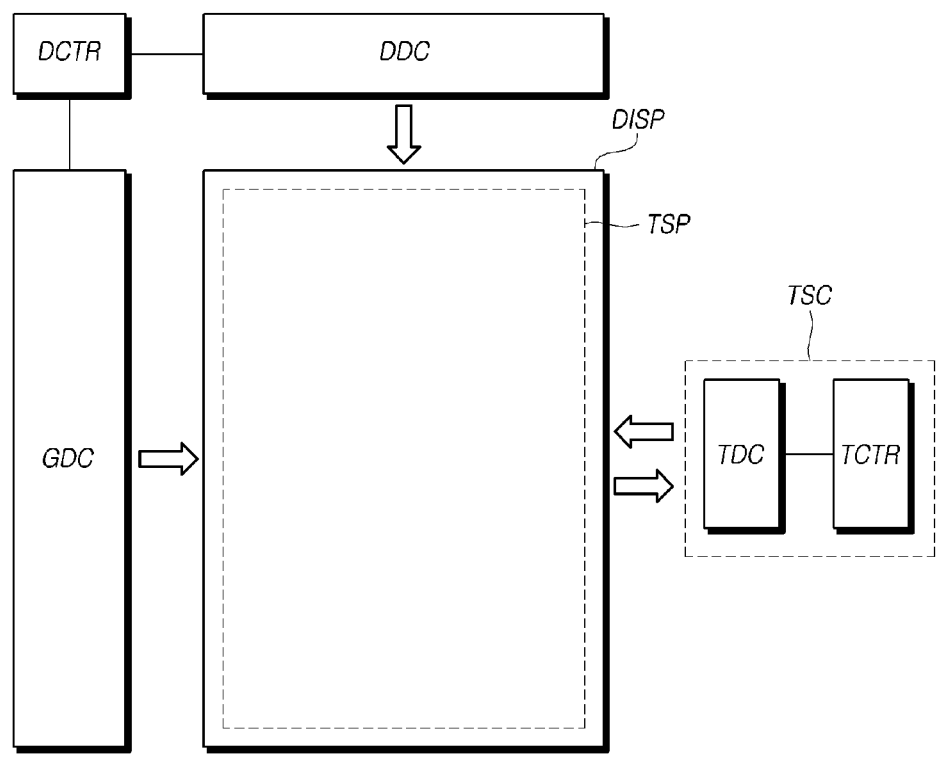
FIG. 1 is a diagram illustrating a schematic configuration of a touch display device according to embodiments of the present disclosure.

In the following description of examples or embodiments of the present disclosure, reference will be made to the accompanying drawings in which it is shown by way of illustration specific examples or embodiments that can be implemented, and in which the same reference numerals and signs can be used to designate the same or like components even when they are shown in different accompanying drawings from one another. Further, in the following description of examples or embodiments of the present disclosure, detailed descriptions of well-known functions and components incorporated herein will be omitted when it is determined that the description can make the subject matter in some embodiments of the present disclosure rather unclear. The terms such as "including", "having", "containing", "constituting" "make up of", and "formed of" used herein are generally intended to allow other components to be added unless the terms are used with the term "only". As used herein, singular forms are intended to include plural forms unless the context clearly indicates otherwise.

Terms, such as "first", "second", "A", "B", "(A)", or "(B)" can be used herein to describe elements of the present disclosure. Each of these terms is not used to define essence, order, sequence, or number of elements etc., but is used merely to distinguish the corresponding element from other elements.

When it is mentioned that a first element "is connected or coupled to", "contacts or overlaps" etc. a second element, it should be interpreted that, not only can the first element "be directly connected or coupled to" or "directly contact or overlap" the second element, but a third element can also be "interposed" between the first and second elements, or the first and second elements can "be connected or coupled to", "contact or overlap", etc. each other via a fourth element. Here, the second element can be included in at least one of two or more elements that "are connected or coupled to", "contact or overlap", etc. each other.

When time relative terms, such as "after," "subsequent to," "next," "before," and the like, are used to describe processes or operations of elements or configurations, or flows or steps in operating, processing, manufacturing methods, these terms can be used to describe non-consecutive or non-sequential processes or operations unless the term "directly" or "immediately" is used together.

In addition, when any dimensions, relative sizes etc. are mentioned, it should be considered that numerical values for an elements or features, or corresponding information (e.g., level, range, etc.) include a tolerance or error range that can be caused by various factors (e.g., process factors, internal or external impact, noise, etc.) even when a relevant description is not specified. Further, the term "may" fully encompasses all the meanings of the term "can".

FIG. 1 is a diagram illustrating a system configuration of a touch display device according to embodiments of the present disclosure. All the components of each touch display device according to all embodiments of the present disclosure are operatively coupled and configured.

Referring to FIG. 1, the touch display device according to the embodiments of the present disclosure can provide both an image display function and a touch-sensing function.

To provide the image display function, the touch display device according to the embodiments of the present disclosure can comprise a display panel DISP in which a plurality of data lines and a plurality of gate lines are disposed and a plurality of subpixels defined by the plurality of data lines and the plurality of gate lines are arrayed; a data driver (or data driver circuit) DDC driving the plurality of data lines; a gate driver (or gate driver circuit) GDC driving the plurality of gate lines; a display controller DCTR controlling the data driver DDC and gate driver GDC, and the like.

Each of the data driver DDC, the gate driver GDC, and the display controller DCTR can be implemented as one or more separate components. In some cases, two or more of the data driver DDC, the gate driver GDC, and the display controller DCTR can be integrated into a single component. For example, the data driver DDC and the display controller DCTR can be implemented as a single integrated circuit (IC) chip.

To provide the touch-sensing function, the touch display device according to embodiments of the present disclosure can comprise a touch panel TSP including a plurality of touch electrodes; and a touch-sensing circuit TSC supplying a touch driving signal to the touch panel TSP, detecting a touch-sensing signal from the touch panel TSP, and detecting a touch of a user or determining a touch position (touch coordinates) on the touch panel TSP on the basis of a detected touch-sensing signal.

For example, the touch-sensing circuit TSC can comprise a touch driving circuit TDC supplying a touch driving signal to the touch panel TSP and detecting a touch-sensing signal from the touch panel TSP; a touch controller TCTR determining at least one of the touch of the user and the touch coordinates on the basis of the touch-sensing signal detected by the touch driving circuit TDC, and the like.

The touch driving circuit TDC can comprise a first circuit part supplying the touch driving signal to the touch panel TSP and a second circuit part detecting the touch-sensing signal from the touch panel TSP.

The touch driving circuit TDC and the touch controller TCTR can be provided as separate components or, in some cases, can be integrated into a single component.

In addition, each of the data driver DDC, the gate driver GDC, and the touch driving circuit TDC is implemented as one or more ICs, and in terms of electrical connection to the display panel DISP, can have a chip-on-glass (COG) structure, a chip-on-film (COF) structure, a tape carrier package (TCP) structure, or the like. In addition, the gate driver GDC can have a gate-in-panel (GIP) structure.

Further, each of the circuit configurations DDC, GDC, and DCTR for display driving and the circuit configurations TDC and TCTR for touch sensing can be implemented as one or more separate components. In some cases, one or more of the display driving circuit configurations DDC, GDC, and DCTR and one or more of the touch-sensing circuit configurations TDC and TCTR can be functionally integrated into one or more components.

For example, the data driver DDC and the touch driving circuit TDC can be integrated into one or more IC chips. In a case in which the data driver DDC and the touch driving circuit TDC are integrated into two or more IC chips, each of the two or more IC chips can have both a data driving function and a touch driving function.

Furthermore, the touch display device according to embodiments of the present disclosure can be various types of devices, such as an organic light-emitting diode (OLED) display device and a liquid crystal display (LCD) device. Hereinafter, the touch display device will be described as an OLED display device for the sake of brevity. For example, although the display panel DISP can be various types of devices, such as an OLED and an LCD, the display panel DISP will be described as an OLED panel as an example for the sake of brevity.

Moreover, as will be described later, the touch panel TSP can comprise a plurality of touch electrodes to which the touch driving signal is applicable or from which the touch-sensing signal is detectable; a plurality of touch routing lines connecting the plurality of touch electrodes to the touch driving circuit TDC; and the like.

The touch panel TSP can be located outside of the display panel DISP. For example, the touch panel TSP and the display panel DISP can be fabricated separately and combined thereafter. Such a touch panel TSP is referred to as an add-on touch panel.

Alternatively, the touch panel TSP can be disposed inside of the display panel DISP. For example, when the display panel DISP is fabricated, touch sensor structures of the touch panel TSP, including the plurality of touch electrodes, the plurality of touch routing lines, and the like, can be provided together with electrodes and signal lines used for the display driving. Such a touch panel TSP is referred to as an in-cell touch panel. Hereinafter, for the sake of brevity, the touch panel TSP will be described as an in-cell touch panel TSP as an example.

Figure 2:
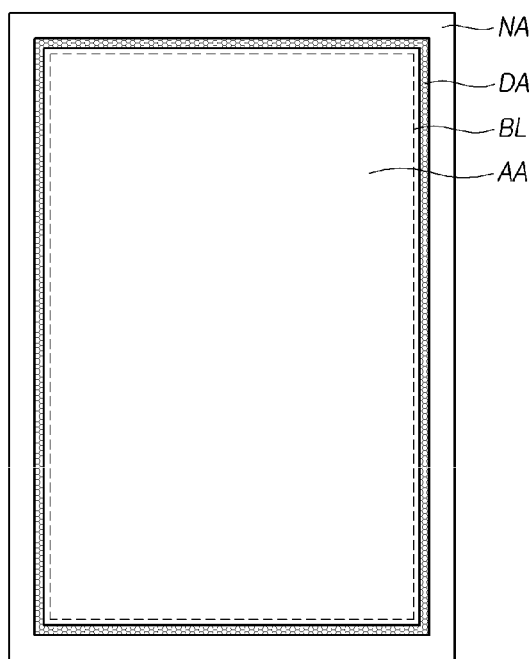
FIG. 2 is a diagram schematically illustrating a display panel of a touch display device according to embodiments of the present disclosure.

FIG. 2 is a diagram schematically illustrating the display panel DISP of the touch display device according to embodiments of the present disclosure.

Referring to FIG. 2, the display panel DISP can comprise an active area AA on which images are displayed and a non-active area NA located outside of an outer boundary line BL of the active area AA.

In the active area AA of the display panel DISP, a plurality of subpixels for displaying images are arranged, and a variety of electrodes and signal lines for the display driving area are disposed.

The plurality of touch electrodes for the touch sensing, the plurality of touch routing lines electrically connected to the plurality of touch electrodes, and the like can be disposed in the active area AA of the display panel DISP. Accordingly, the active area AA can also be referred to as a touch-sensing area in which the touch sensing can be performed.

In the non-active area NA of the display panel DISP, link lines produced by extending a variety of signal lines disposed in the active area AA or link lines electrically connected to the variety of signal lines disposed in the active area AA and pads electrically connected to the link lines can be disposed. The pads disposed in the non-active area NA can be bonded or electrically connected to the display driving circuits, such as DDC and GDC.

In in the non-active area NA of the display panel DISP, link lines produced by extending a plurality of touch routing lines disposed in the active area AA or link lines electrically connected to the plurality of touch routing lines disposed in the active area AA and pads electrically connected to the link lines can be disposed. The pads disposed in the non-active area NA can be bonded or electrically connected to the touch driving circuit TDC.

In the non-active area NA, portions produced by expanding portions of the outermost touch electrodes among the plurality of touch electrodes disposed in the active area AA can be provided, and one or more electrodes (e.g., touch electrodes) made of the same material as the plurality of touch electrodes disposed in the active area AA can be further disposed.

For example, the entirety of the plurality of touch electrodes disposed in the display panel DISP can be located in the active area AA, specific touch electrodes (e.g., the outermost touch electrodes) among the plurality of touch electrodes disposed in the display panel DISP can be located in the non-active area NA, or specific touch electrodes (e.g., the outermost touch electrodes) among the plurality of touch electrodes disposed in the display panel DISP can extend across at least a portion of the active area AA and at least a portion of the non-active area NA.

In addition, referring to FIG. 2, the display panel DISP of the touch display device according to embodiments of the present disclosure can comprise a dam area DA in which a dam DAM (see FIG. 9) is disposed, the dam DAM serving to prevent a layer (e.g., an encapsulation layer in the OLED display panel) in the active area AA from collapsing.

The dam area DA can be located at the boundary between the active area AA and the non-active area NA, in a location of the non-active area NA at the periphery of the active area AA, or the like.

The dam disposed in the dam area DA can be disposed to surround the active area AA in all directions or only at the periphery of one or more portions (i.e., portions in which a fragile layer is located) of the active area AA.

The dams disposed in the dam area DA can be connected to be made as a single pattern or to be made as two or more separate patterns. In addition, in the dam area DA, only a first dam can be disposed, or two dams (i.e., a first dam and a second dam) can be disposed, or three or more dams can be disposed.

In the dam area DA, the first dam can only be provided in one direction, and both the first dam and the second dam can be provided in the other direction.

Figure 3:
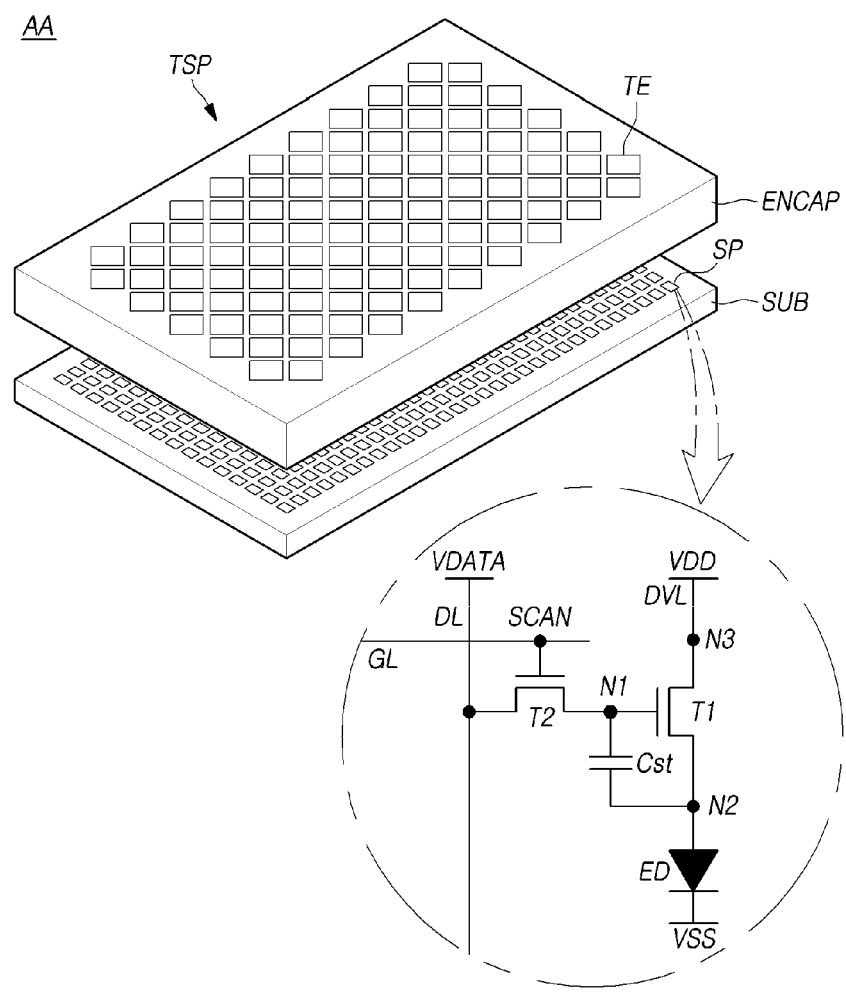
FIG. 3 is a diagram illustrating a structure in which a touch panel is disposed as an in-cell structure in a display panel according to embodiments of the present disclosure.

FIG. 3 is a diagram illustrating a structure in which the touch panel TSP is disposed as an in-cell structure in the display panel DISP according to embodiments of the present disclosure.

Referring to FIG. 3, a plurality of subpixels SP are arrayed on a substrate SUB in the active area AA of the display panel DISP.

Each of the subpixels SP can comprise an emitting device ED, a first transistor T1 driving the emitting device ED, a second transistor T2 delivering a data voltage VDATA to a first node N1 of the first transistor T1, a storage capacitor Cst maintaining a predetermined voltage for a single frame, and the like.

The first transistor T1 can comprise the first node N1 to which the data voltage VDATA is applicable, a second node N2 electrically connected to the emitting device ED, and a third node N3 to which a driving voltage is applied from a driving voltage line DVL. The first node N1 can be a gate node, the second node N2 can be a source node or a drain node, and the third node N3 can be a drain node or a source node. Such a first transistor T1 is also referred to as a driving transistor driving the emitting device ED.

The emitting device ED can comprise a first electrode (e.g., an anode), an emissive layer, and a second electrode (e.g., a cathode). The first electrode can be electrically connected to the second node N2 of the first transistor T1, and the second electrode can have a base voltage VSS applied thereto.

The emissive layer of the emitting device ED can be an organic emissive layer containing an organic material. In this case, the emitting device ED can be an organic light-emitting diode (OLED).

The second transistor T2 can be on/off controlled by a scan signal SCAN applied through a gate line GL and be electrically connected to the first node N1 of the first transistor T1 and a data line DL. Such a second transistor T2 is also referred to as a switching transistor.

When the second transistor T2 is turned on by the scan signal SCAN, the second transistor T2 delivers the data voltage VDATA supplied through the data line DL to the first node N1 of the first transistor T1.

The storage capacitor Cst can be electrically connected to the first node N1 and the second node N2 of the first transistor T1.

As illustrated in FIG. 3, each of the subpixels SP can have a 2T1C comprised of two transistors T1 and T2 and a single capacitor Cst. In some cases, each of the subpixels SP can further comprise one or more transistors or one or more capacitors.

The storage capacitor Cst can be an external capacitor intentionally designed to be disposed externally of the first transistor T1, rather than a parasitic capacitor (e.g., Cgs or Cgd), i.e., an internal capacitor present between the first node N1 and the second node N2 of the first transistor T1.

Each of the first transistor T1 and the second transistor T2 can be an n-type transistor or a p-type transistor.

As described above, circuit components, including the emitting device ED, two or more transistors T1 and T2, and one or more capacitor Cst, are disposed in the display panel DISP. Since such circuit components (in particular, the emitting device ED) are vulnerable to external moisture, oxygen, or the like, an encapsulation layer ENCAP preventing external moisture or oxygen from penetrating the circuit elements (in particular, the emitting device ED) can be disposed in the display panel DISP.

Such an encapsulation layer ENCAP can be a single layer or have a multilayer structure.

In addition, in the touch display device according to embodiments of the present disclosure, the touch panel TSP can be disposed on the encapsulation layer ENCAP.

For example, in the touch display device, a touch sensor structure, including the plurality of touch electrodes TE, of the touch panel TSP can be disposed on the encapsulation layer ENCAP.

In the touch sensing, the touch driving signal or the touch-sensing signal can be applied to the touch electrodes TE. Then, in the touch sensing, a potential difference can be produced between a touch electrode TE and a cathode disposed on both sides of the encapsulation layer ENCAP, thereby generating unnecessary parasitic capacitance. Since such parasitic capacitance can reduce touch sensitivity, the distance between the touch electrode TE and the cathode can be designed to be a predetermined value (e.g., 1 µm) or more in consideration of the thickness of the panel, a panel fabrication process, display performance, and the like in order to reduce the parasitic capacitance. In this regard, for example, the thickness of the encapsulation layer ENCAP can be designed to be 1 µm or more.

Figure 4:
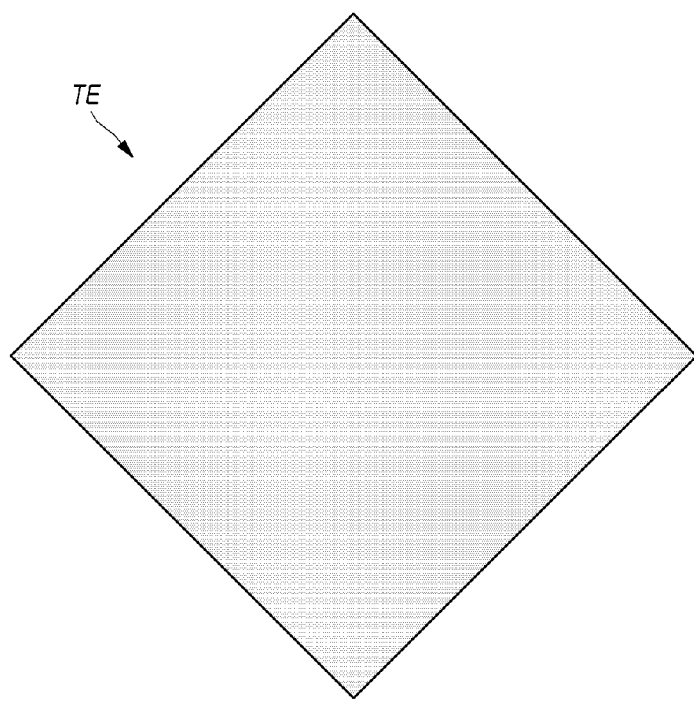
FIGS. 4 and 5 are diagrams illustrating two different types of touch electrodes disposed in a display panel according to embodiments of the present disclosure.
Figure 5:
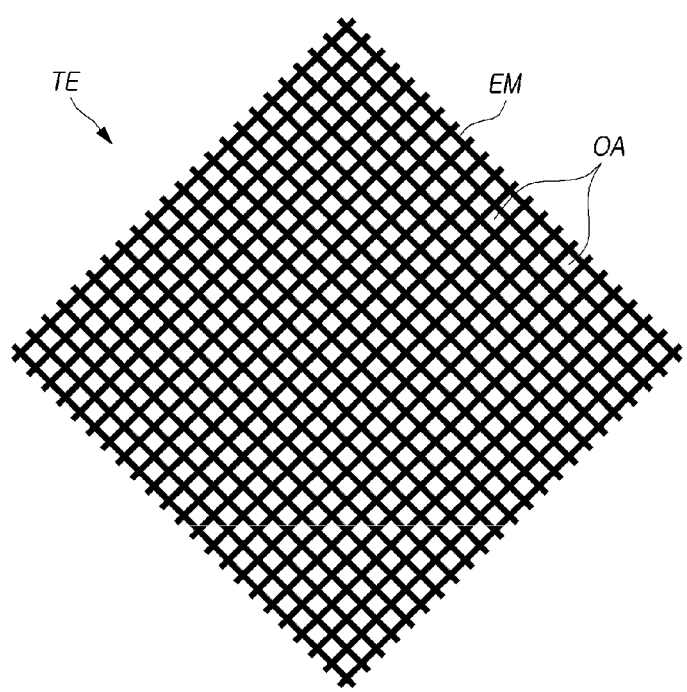

FIGS. 4 and 5 are diagrams illustrating different types of touch electrodes TE disposed in the display panel DISP according to embodiments of the present disclosure.

As illustrated in FIG. 4, each of the touch electrodes TE disposed in the display panel DISP can be a plate-shaped electrode metal without an open area. In this case, each of the touch electrodes TE can be a transparent electrode. For example, each of the touch electrodes TE can be made of a transparent electrode material such that light emitted by the plurality of subpixels SP disposed below the touch electrodes TE can pass through the touch electrodes TE.

Alternatively, as illustrated in FIG. 5, each of the touch electrodes TE disposed in the display panel DISP can be an electrode metal EM in the shape of a patterned mesh having two or more open areas OA.

The electrode metal EM is a portion substantially corresponding to the touch electrode TE and is a portion to which the touch driving signal is applied or from which the touch-sensing signal is detected.

As illustrated in FIG. 5, in a case in which each of the touch electrodes TE is the electrode metal EM in the shape of a patterned mesh, two or more open areas OA can be present in the area of the touch electrode TE.

Each of the plurality of open areas OA provided in each of the touch electrodes TE can correspond to the emitting area of one or more subpixels SP. For example, the plurality of open areas OA are passages allowing light emitted from the plurality of subpixels SP located therebelow to pass upward therethrough. Hereinafter, for the sake of brevity, each of the touch electrodes TE will be described as a mesh-shaped electrode metal EM as an example.

The electrode metal EM corresponding to each of the touch electrodes TE can be located on a bank disposed in an area, except for the emitting area of two or more subpixels SP.

In addition, a method of fabricating a plurality of touch electrode TE can comprise making a mesh-shaped electrode metal EM having a wider area and then cutting the electrode metal EM to be made as a predetermined pattern such that portions of the electrode metal EM are electrically separated from each other, thereby fabricating a plurality of touch electrodes TE.

The outline of the touch electrode TE can have a rectangular shape, such as a diamond or a rhombus shape, as illustrated in FIGS. 4 and 5, or a variety of other shapes, such as a triangle, a pentagon, or a hexagon.

Figure 6:
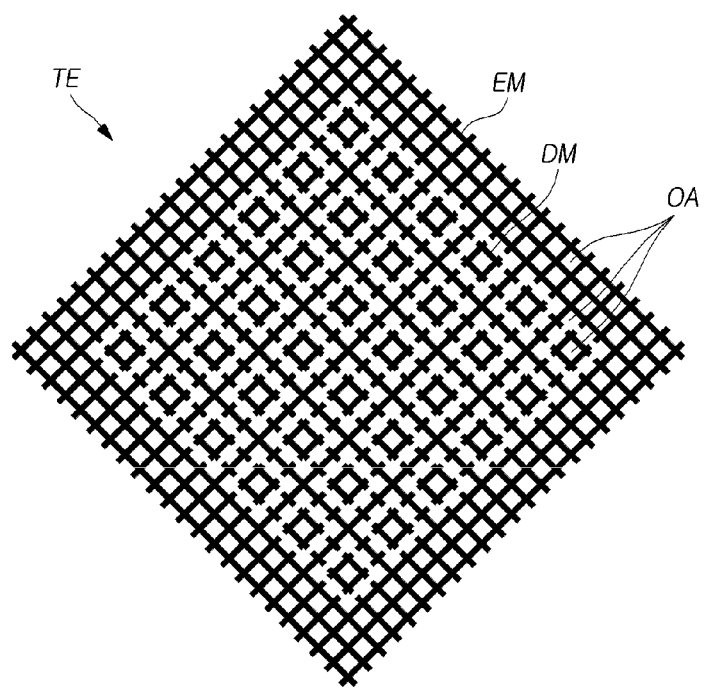
FIG. 6 is a diagram illustrating the mesh-shaped touch electrode illustrated in FIG. 5.

FIG. 6 is a diagram illustrating the mesh-shaped touch electrode TE illustrated in FIG. 5.

Referring to FIG. 6, in the area of each of the touch electrodes TE, one or more dummy metals DM disconnected from the mesh-shaped electrode metal EM can be provided.

The electrode metal EM is a portion substantially corresponding to the touch electrode TE and is a portion to which the touch driving signal is applied or from which the touch-sensing signal is detected. In contrast, the dummy metals DM are portions to which the touch driving signal is not applied and from which the touch-sensing signal is not detected, although the dummy metals DM are portions located in the area of the touch electrode TE. For example, the dummy metals DM can be electrically floating metals.

Thus, the electrode metal EM can be electrically connected to the touch driving circuit TDC, but none of the dummy metals DM are electrically connected to the touch driving circuit TDC.

In the area of each of the entire touch electrodes TE, one or more dummy metals DM can be provided while being disconnected from the electrode metals EM. Although FIG. 6 illustrates an example of a structure that the dummy metal DM is disposed on some area in an area of the touch electrode TE, the dummy metal DM can be present on whole area in the area of the touch electrode TE. Furthermore, the touch electrode TE can include the dummy metal DM or may not include the dummy metal DM, according to locations where the touch electrode TE is disposed.

For example, one or more dummy metal DM can be present to be separated from the electrode metal EM only in an area of each of some touch electrode TE of all touch electrodes TE. For example, the dummy metal DM may not be present in an area of some touch electrode TE.

The function of the dummy metals DM is related to a visibility issue. In a case in which only the mesh-shaped electrode metal EM is present in the area of the touch electrode TE without one or more dummy metals DM being present in the area of the touch electrode TE as illustrated in FIG. 5, the outline of the electrode metal EM can appear on the screen, thereby causing a visibility issue.

In contrast, in a case in which one or more dummy metals DM are present in the area of the touch electrode TE as illustrated in FIG. 6, the outline of the electrode metal EM appearing on the screen, i.e., the visibility issue, can be prevented.

In addition, touch sensitivity can be improved by adjusting the magnitude of capacitance according to each of the touch electrodes TE by adjusting the presence or absence or the number (or ratio) of the dummy metals DM of each of the touch electrodes TE.

In addition, specific points of the electrode metal EM provided in the area of a single touch electrode TE can be cut, so that the cut electrode metal EM form dummy metals DM. For example, the electrode metal EM and the dummy metals DM can be made of the same material provided on the same layer.

In addition, the touch display device according to embodiments of the present disclosure can detect a touch on the basis of capacitance generated on the touch electrode TE.

The touch display device according to embodiments of the present disclosure can detect a touch by a capacitance-based touch sensing method, more particularly, mutual capacitance-based touch sensing or self-capacitance-based touch sensing.

In the mutual capacitance-based touch sensing, the plurality of touch electrodes TE can be divided into driving touch electrodes (or transmitting touch electrodes) to which the touch driving signal is applied and sensing touch electrodes (or receiving touch electrodes) detecting the touch sensing signal and generating capacitance together with the driving touch electrodes.

In the mutual capacitance-based touch sensing, the touch-sensing circuit TSC detects a touch and determines touch coordinates on the basis of changes in the capacitance (i.e., mutual capacitance) occurring between the driving touch electrodes and the sensing touch electrodes, depending on the presence or absence of a pointer, such as a finger or a pen.

In the self-capacitance-based touch sensing, each of the touch electrodes TE serves as both a driving touch electrode and a sensing touch electrode. For example, the touch-sensing circuit TSC detects a touch and determines touch coordinates by applying the touch driving signal to one or more touch electrodes TE, detecting the touch-sensing signal through the touch electrode TE to which the touch driving signal is applied, and recognizing changes in the capacitance between the pointer, such as a finger or a pen, and the touch electrode TE, on the basis of the detected touch-sensing signal. Accordingly, in the self-capacitance-based touch sensing, there is no difference between the driving touch electrodes and the sensing touch electrodes.

As described above, the touch display device according to embodiments of the present disclosure can perform the touch sensing by the mutual capacitance-based touch sensing or the self-capacitance-based touch sensing. Hereinafter, for the sake of brevity, the touch display device performing the mutual capacitance-based touch sensing and having a touch sensor structure for the mutual capacitance-based touch sensing will be described as an example.

Figure 7:
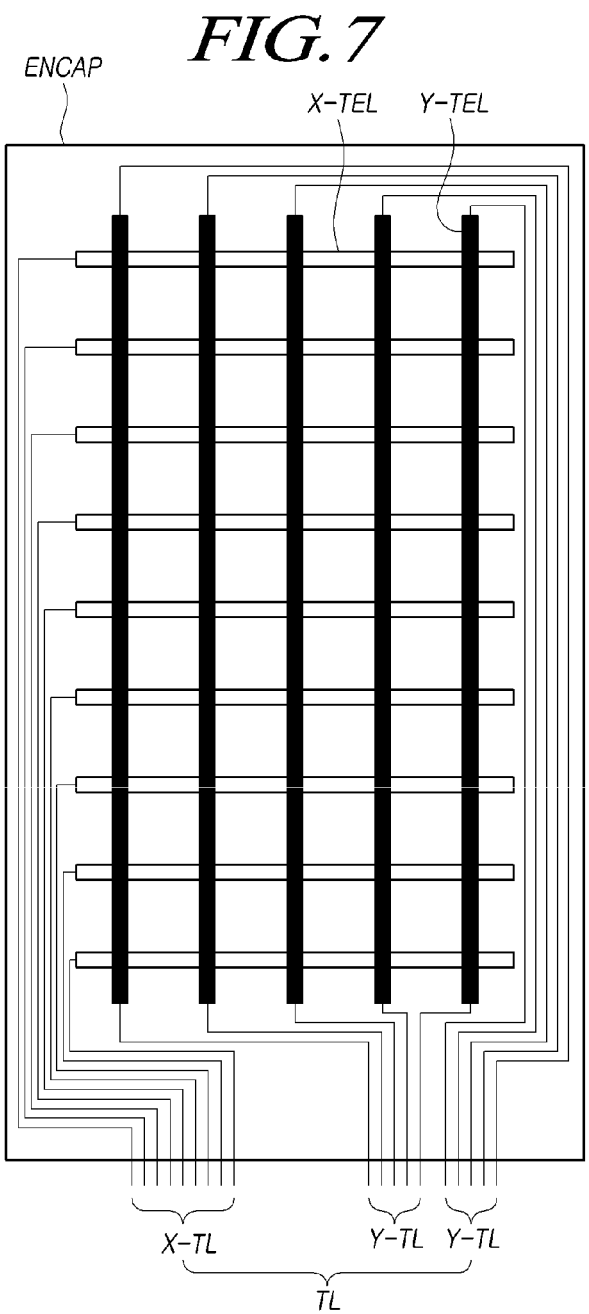
FIG. 7 is a diagram schematically illustrating a touch sensor structure in a display panel according to embodiments of the present disclosure.
Figure 8:
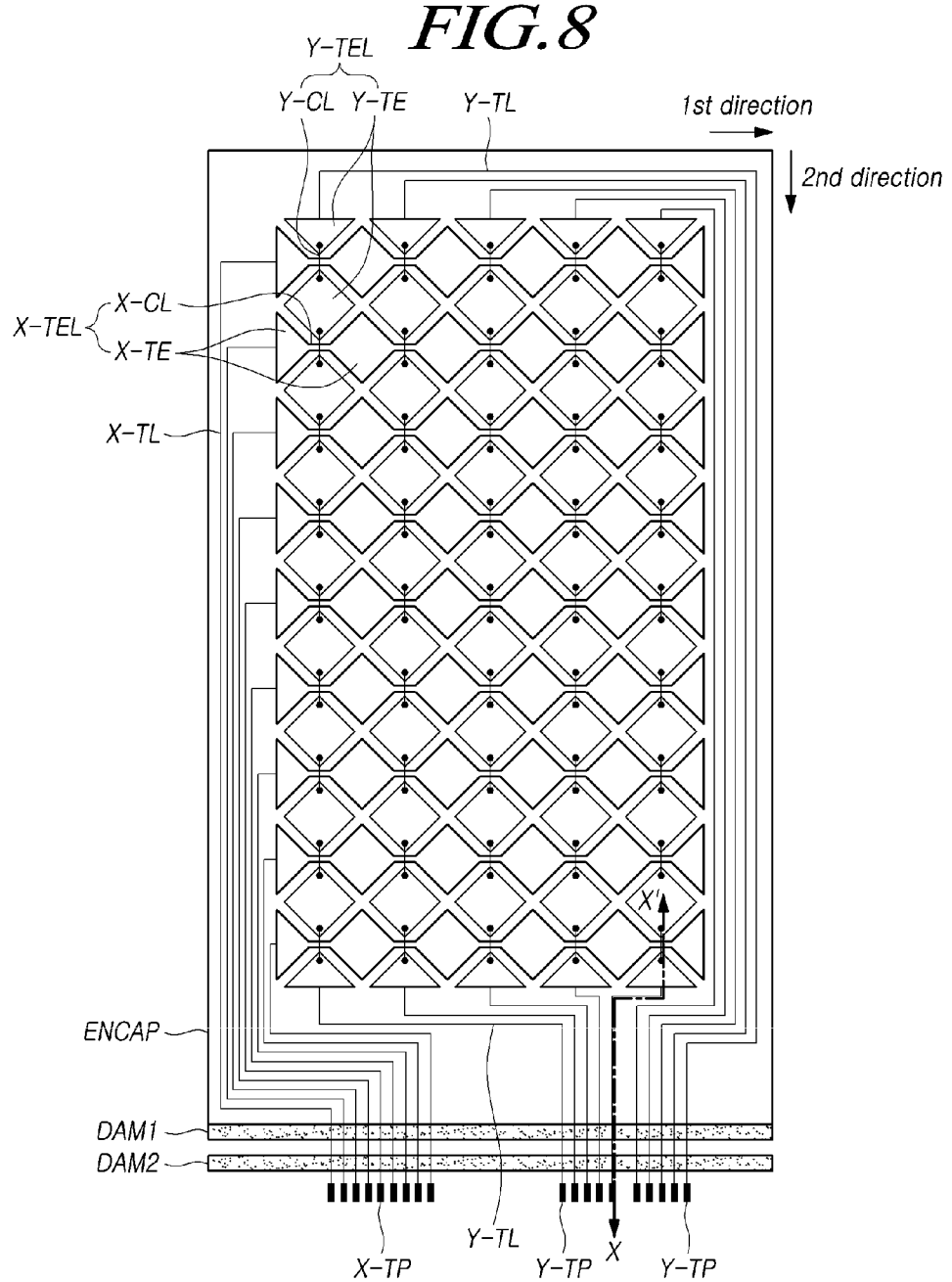
FIG. 8 is a diagram illustrating an example of the touch sensor structure illustrated in FIG. 7.

FIG. 7 is a diagram schematically illustrating a touch sensor structure in the display panel DISP according to embodiments of the present disclosure, and FIG. 8 is a diagram illustrating an example of the touch sensor structure illustrated in FIG. 7.

Referring to FIG. 7, the touch sensor structure for the mutual capacitance-based touch sensing can comprise a plurality of X-touch electrode lines X-TEL and a plurality of Y-touch electrode lines Y-TEL. Here, the plurality of X-touch electrode lines X-TEL and the plurality of Y-touch electrode lines Y-TEL are located on the encapsulation layer ENCAP. The X-touch electrode lines can be referred to as first-touch electrode lines, and the Y-touch electrode lines can be referred to as second-touch electrode lines, or vice versa.

Each of the plurality of X-touch electrode lines X-TEL can be disposed in a first direction, and the plurality of Y-touch electrode lines Y-TEL can be disposed in a second direction different from the first direction.

Herein, the first direction and the second direction can be different directions. For example, the first direction can be the X-axis direction, while the second direction can be the Y-axis direction. Alternatively, the first direction can be the Y-axis direction, while the second direction can be the X-axis direction. In addition, the first direction and the second direction can or may not intersect perpendicularly. For example, the first and second directions can be perpendicular or substantially perpendicular to each other. In addition, the terms "column" and "row" as used herein are relative terms. The column and the row can be switched depending on the viewing perspective.

Each of the plurality of X-touch electrode lines X-TEL can be comprised of a plurality of X-touch electrodes X-TE electrically connected to each other. Each of the plurality of Y-touch electrode lines Y-TEL can be comprised of a plurality of Y-touch electrodes Y-TE electrically connected to each other.

Here, the plurality of X-touch electrodes X-TE and the plurality of Y-touch electrodes Y-TE are electrodes included in the plurality of touch electrodes TE, and have different functions.

For example, the plurality of X-touch electrodes X-TE constituting each of the plurality of X-touch electrode lines X-TEL can be the driving touch electrodes, while the plurality of Y-touch electrodes Y-TE constituting each of the plurality of Y-touch electrode lines Y-TEL can be the sensing touch electrodes. In this case, each of the plurality of X-touch electrode lines X-TEL corresponds to a driving touch electrode lines, and each of the plurality of Y-touch electrode lines Y-TEL corresponds to a sensing touch electrode line.

Alternatively, the plurality of X-touch electrodes X-TE constituting each of the plurality of X-touch electrode lines X-TEL can be the sensing touch electrodes, while the plurality of Y-touch electrodes Y-TE constituting each of the plurality of Y-touch electrode lines Y-TEL can be the driving touch electrodes. In this case, each of the plurality of X-touch electrode lines X-TEL corresponds to the sensing touch electrode line, and each of the plurality of Y-touch electrode lines Y-TEL corresponds to the driving touch electrode line.

A touch sensor metal TSM for the touch sensing can comprise a plurality of touch routing lines TL in addition to the plurality of X-touch electrode lines X-TEL and the plurality of Y-touch electrode lines Y-TEL.

The plurality of touch routing lines TL can comprise one or more X-touch routing lines X-TL connected to the plurality of X-touch electrode lines X-TEL, respectively, and one or more Y-touch routing lines Y-TL connected to the plurality of Y-touch electrode lines Y-TEL, respectively.

Referring to FIG. 8, each of the plurality of X-touch electrode lines X-TEL can comprise a plurality of X-touch electrodes X-TE disposed in the same row (or column) and one or more X-touch electrode connecting lines X-CL electrically connecting the plurality of X-touch electrodes X-TE. Here, the X-touch electrode connecting lines X-CL respectively connecting two adjacent X-touch electrodes X-TE can be metals integrated with the two adjacent X-touch electrodes X-TE (see FIG. 8) or metals connected to the two adjacent X-touch electrodes X-TE via contact holes.

Each of the plurality of Y-touch electrode lines Y-TEL can comprise a plurality of Y-touch electrodes Y-TE disposed in the same column (or row) and one or more Y-touch electrode connecting lines Y-CL electrically connecting the plurality of Y-touch electrodes Y-TE. Here, the Y-touch electrode connecting lines Y-CL respectively connecting two adjacent Y-touch electrodes Y-TE can be metals integrated with the two adjacent Y-touch electrodes Y-TE or metals connected to the two adjacent Y-touch electrodes Y-TE via contact holes (see FIG. 8).

In areas in which the X-touch electrode lines X-TEL intersect the Y-touch electrode lines Y-TEL (i.e., touch electrode line intersecting areas), the X-touch electrode connecting lines X-CL can intersect the Y-touch electrode connecting lines Y-CL.

In a case in which the X-touch electrode connecting lines X-CL intersect the Y-touch electrode connecting lines Y-CL in the touch electrode line intersecting areas as described above, the X-touch electrode connecting lines X-CL must be located on a layer different from that of the Y-touch electrode connecting lines Y-CL.

Accordingly, the plurality of X-touch electrodes X-TE, the plurality of X-touch electrode connecting lines X-CL, the plurality of Y-touch electrodes Y-TE, the plurality of Y-touch electrode lines Y-TEL, and the plurality of Y-touch electrode connecting lines Y-CL can be located on two or more layers, such that the plurality of X-touch electrode lines X-TEL intersect the plurality of Y-touch electrode lines Y-TEL.

Referring to FIG. 8, each of the plurality of X-touch electrode lines X-TEL is electrically connected to a corresponding X-touch pad X-TP through one or more X-touch routing lines X-TL. For example, the outermost X-touch electrode X-TE among the plurality of X-touch electrodes X-TE included in a single X-touch electrode line X-TEL is electrically connected to a corresponding X-touch pad X-TP via the X-touch routing line X-TL.

Each of the plurality of Y-touch electrode lines Y-TEL is electrically connected to corresponding Y-touch pads Y-TP through one or more Y-touch routing lines Y-TL. For example, the outermost Y-touch electrodes Y-TE among the plurality of Y-touch electrodes Y-TE included in a single Y-touch electrode line Y-TEL is electrically connected to the corresponding Y-touch pads Y-TP through the Y-touch routing lines Y-TL.

As illustrated in FIG. 8, the plurality of X-touch electrode lines X-TEL and the plurality of Y-touch electrode lines Y-TEL can be disposed on the encapsulation layer ENCAP. For example, the plurality of X-touch electrodes X-TE, constituting the plurality of X-touch electrode lines X-TEL, and the plurality of X-touch electrode connecting lines X-CL can be disposed on the encapsulation layer ENCAP. The plurality of Y-touch electrodes Y-TE, constituting the plurality of Y-touch electrode lines Y-TEL, and the plurality of Y-touch electrode connecting lines Y-CL can be disposed on the encapsulation layer ENCAP.

As illustrated in FIG. 8, the plurality of X-touch routing lines X-TL electrically connected to the plurality of X-touch electrode lines X-TEL can be disposed on the encapsulation layer ENCAP and extend to a location in which the encapsulation layer ENCAP is not provided, thereby being electrically connected to a plurality of X-touch pads X-TP, respectively. The plurality of Y-touch routing lines Y-TL electrically connected to the plurality of Y-touch electrode lines Y-TEL can be disposed on the encapsulation layer ENCAP and extend to a location in which encapsulation layer ENCAP is not provided, thereby being electrically connected to a plurality of Y-touch pads Y-TP, respectively. Here, the encapsulation layer ENCAP can be located in the active area AA and, in some cases, can expand to the non-active area NA.

In addition, as described above, a dam area DA can be provided at the boundary between the active area AA and the non-active area NA or in the non-active area NA at the periphery of the active area AA in order to prevent a layer (e.g., an encapsulation in the OLED display panel) in the active area AA from collapsing.

As illustrated in FIG. 8, for example, a first dam DAM1 and a second dam DAM2 can be disposed in the dam area DA. Here, the second dam DAM2 can be located more outward than the first dam DAM1.

In a manner different from that illustrated in FIG. 8, only the first dam DAM1 can be located in the dam area DA. In some cases, not only the first dam DAM1 and the second dam DAM2 but also one or more additional dam can be disposed in the dam area DA.

Referring to FIG. 8, the encapsulation layer ENCAP can be located on a side of the first dam DAM1 or be located both on a side of and above the first dam DAM1.

Figure 9:
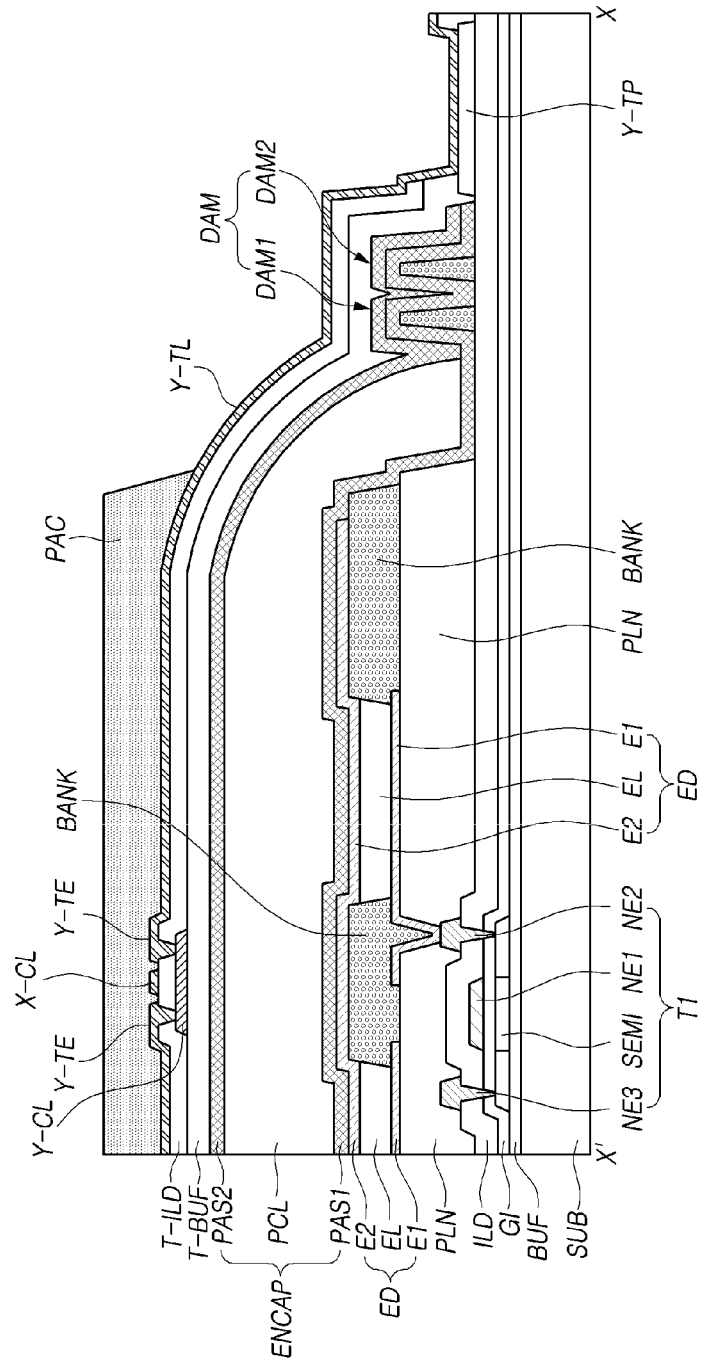
FIG. 9 is a cross-sectional diagram illustrating portions of the display panel according to embodiments of the present disclosure, taken along line X-X' in FIG. 8.

FIG. 9 is a cross-sectional diagram illustrating portions of the display panel DISP according to embodiments of the present disclosure, taken along line X-X' in FIG. 8. In FIG. 9, the touch electrode TE is illustrated in the shape of a plate. However, this is illustrative only, and the touch electrode TE can be mesh shaped. In a case in which the touch electrode TE is mesh shaped, the open areas OA of the touch electrode TE can be located above the emissive areas of subpixels SP.

Referring to FIG. 9, the first transistor T1, i.e., the driving transistor in each of the subpixels SP in the active area AA, is disposed on the substrate SUB.

The first transistor T1 comprises a first node electrode NE1 corresponding to the gate electrode, a second node electrode NE2 corresponding to a source electrode or a drain electrode, a third node electrode NE3 corresponding to a drain electrode or a source electrode, a semiconductor layer SEMI, and the like.

The first node electrode NE1 and the semiconductor layer SEMI can be located on both sides of a gate insulating film GI to overlap each other. The second node electrode NE2 can be provided on an interlayer insulating film ILD to be in contact with one side of the semiconductor layer SEMI, while the third node electrode NE3 can be provided on the interlayer insulating film ILD to be in contact with the other side of the semiconductor layer SEMI.

The emitting device ED can comprise a first electrode E1 corresponding to an anode (or cathode), an emitting layer EL provided on the first electrode E1, a second electrode E2 corresponding to a cathode (or anode) provided on the emitting layer EL, and the like.

The first electrode E1 is electrically connected to the second node electrode NE2 of the first transistor T1, exposed through a pixel contact hole extending through a planarization layer PLN.

The emitting layer EL is provided on the first electrode E1 in the emitting area provided by banks BANK. The emitting layer EL is provided on the first electrode El and is comprised of a hole-related layer, an emissive layer, and an electron-related layer stacked in the stated order or inversely. The second electrode E2 is provided on the side of the emitting layer EL opposite to the first electrode El.

The encapsulation layer ENCAP prevents external moisture or oxygen from penetrating the emitting device ED vulnerable to external moisture, oxygen, or the like.

The encapsulation layer ENCAP can be a single layer or, as illustrated in FIG. 9, be comprised of a plurality of layers PAS1, PCL, and PAS2.

For example, in a case in which the encapsulation layer ENCAP is comprised of the plurality of layers PAS1, PCL, and PAS2, the encapsulation layer ENCAP can comprise one or more inorganic encapsulation layers PAS1 and PAS2 and one or more organic encapsulation layers PCL. As a specific example, the encapsulation layer ENCAP can have a structure in which the first inorganic encapsulation layer PAS1, the organic encapsulation layer PCL, and the second inorganic encapsulation layer PAS2 are stacked in order.

Here, the organic encapsulation layer PCL can further comprise at least one organic encapsulation layer or at least one inorganic encapsulation layer.

The first inorganic encapsulation layer PAS1 is provided on the substrate SUB, on which the second electrode E2 corresponding to the cathode is provided, so as to be closest to the emitting device ED. The first inorganic encapsulation layer PAS1 is made of an inorganic insulating material, such as silicon nitride (SiNx), silicon oxide (SiOx), silicon oxynitride (SiON), or aluminum oxide ($Al_2O_3$), which can be deposited at a low temperature. Since the first inorganic encapsulation layer PAS1 is deposited in a low-temperature atmosphere, the first inorganic encapsulation layer PAS1 can prevent the emitting layer EL containing an organic material vulnerable to a high-temperature atmosphere from being damaged during deposition processing.

The organic encapsulation layer PCL can be provided in an area smaller than the area of the first inorganic encapsulation layer PAS1. In this case, the organic encapsulation layer PCL can be configured to expose both edges of the first inorganic encapsulation layer PAS1. The organic encapsulation layer PCL can serve as a buffer to reduce stress between the layers caused by bending of the touch display device and serve to enhance planarization performance. The organic encapsulation layer PCL can be made of, for example, an organic insulating material, such as an acrylic resin, an epoxy resin, polyimide, polyethylene, silicon oxycarbon (SiOC).

In addition, in a case in which the organic encapsulation layer PCL is fabricated by inkjet printing, one or more dams DAM can be provided in the dam area DA corresponding to the boundary between the non-active area NA and the active area AA or a portion of the non-active area NA.

For example, as illustrated in FIG. 9, the dam area DA is located between a pad area in the non-active area NA and the active area AA. The pad area refers to a portion of the non-active area NA in which the plurality of X-touch pads X-TP and the plurality of Y-touch pads Y-TP are provided. In the dam area DA, the first dam DAM1 adjacent to the active area AA and the second dam DAM2 adjacent to the pad area can be provided.

The one or more dams DAM disposed in the dam area DA can prevent the organic encapsulation layer PCL in a liquid form from collapsing in the direction of the non-active area NA and penetrating into the pad area when the organic encapsulation layer PCL in the liquid form is dropped to the active area AA.

This effect can be further increased by the provision of the first dam DAM1 and the second dam DAM2 as illustrated in FIG. 9.

At least one of the first dam DAM1 and the second dam DAM2 can have a single layer or multilayer structure. For example, at least one of the first dam DAM1 and the second dam DAM2 can be simultaneously made of the same material as at least one of the banks BANK and spacers. In this case, a dam structure can be provided without additional mask processing or an increase in cost.

In addition, as illustrated in FIG. 9, at least one of the first dam DAM1 and the second dam DAM2 can have a structure in which at least one of the first inorganic encapsulation layer PAS1 and the second inorganic encapsulation layer PAS2 is stacked on the banks BANK.

In addition, the organic encapsulation layer PCL containing an organic material can be located on an inner side of the first dam DAM1, as illustrated in FIG. 9.

Alternatively, the organic encapsulation layer PCL containing an organic material can be located above at least a portion of the first dam DAM1 and the second dam DAM2. For example, the organic encapsulation layer PCL can be located above the first dam DAM1.

The second inorganic encapsulation layer PAS2 can be provided on the substrate SUB on which the organic encapsulation layer PCL is provided, so as to cover the top surfaces and side surfaces of the organic encapsulation layer PCL and the first inorganic encapsulation layer PAS1. The second inorganic encapsulation layer PAS2 minimizes or prevents external moisture or oxygen from penetrating the first inorganic encapsulation layer PAS1 or the organic encapsulation layer PCL. The second inorganic encapsulation layer PAS2 is made of, for example, an inorganic insulating material, such as SiNx, SiOx, SiON, or $Al_2O_3$.

A touch buffer film T-BUF can be provided on the encapsulation layer ENCAP. The touch buffer film T-BUF can be located between the touch sensor metal TSM, including the X and Y-touch electrodes X-TE and Y-TE and X and Y-touch electrode connecting lines X-CL and Y-CL, and the second electrode E2 of the emitting device ED.

The touch buffer film T-BUF can be designed to maintain a predetermined minimum distance (e.g., 1 μm) between the touch sensor metal TSM and the second electrode E2 of the emitting device ED. Accordingly, this can reduce or prevent parasitic capacitance generated between the touch sensor metal TSM and the second electrode E2 of the emitting device ED, thereby preventing touch sensitivity from being reduced by the parasitic capacitance.

Without the touch buffer film T-BUF, the touch sensor metal TSM comprising the X and Y-touch electrodes X-TE and Y-TE and the X and Y-touch electrode connecting lines X-CL and Y-CL can be disposed on the encapsulation layer ENCAP.

In addition, the touch buffer film T-BUF can prevent the emitting layer EL containing the organic material from being penetrated by a chemical agent (e.g., a developing solution or an etching solution) used in fabrication processing of the touch sensor metal TSM disposed on the touch buffer film T-BUF, external moisture, or the like. Accordingly, the touch buffer film T-BUF can prevent the emitting layer EL vulnerable to the chemical agent or moisture from being damaged.

The touch buffer film T-BUF is made of an organic insulating material producible at a low temperature equal to or lower than a predetermined temperature (e.g., 100° C.) and having a low dielectric constant of 1 to 3 in order to prevent the emitting layer EL containing the organic material vulnerable to high temperature from being damaged. For example, the touch buffer film T-BUF can be made of an epoxy-based material or a siloxane-based material. The touch buffer film T-BUF made of an inorganic insulating material and having a planarization performance can prevent the layers PAS1, PCL, and PAS2 included in the encapsulation layer ENCAP from being damaged or the touch sensor metal TSM on the touch buffer film T-BUF from being fractured in response to the bending of the OLED display device.

According to the mutual capacitance-based touch sensor structure, the X-touch electrode lines X-TEL and the Y-touch electrode lines Y-TEL are disposed on the touch buffer film T-BUF, and the X-touch electrode lines X-TEL and the Y-touch electrode lines Y-TEL can be disposed such that the X-touch electrode lines X-TEL intersect the Y-touch electrode lines Y-TEL.

The Y-touch electrode lines Y-TEL can comprise the plurality of Y-touch electrodes Y-TE and the plurality of Y-touch electrode connecting lines Y-CL electrically connecting the plurality of Y-touch electrodes Y-TE.

As illustrated in FIG. 9, the plurality of Y-touch electrodes Y-TE and the plurality of Y-touch electrode connecting lines Y-CL can be disposed on different layers, on both sides of a touch insulating film T-ILD.

The plurality of Y-touch electrodes Y-TE can be spaced apart from each other by predetermined distances in the Y-axis direction. Each of the plurality of Y-touch electrodes Y-TE can be electrically connected to the other adjacent Y-touch electrodes Y-TE through the Y-touch electrode connecting lines Y-CL in the Y-axis direction.

The Y-touch electrode connecting lines Y-CL can be provided on the touch buffer film T-BUF and exposed through touch contact holes extending through the touch insulating film T-ILD to be electrically connected to the two adjacent Y-touch electrodes Y-TE in the Y-axis direction.

The Y-touch electrode connecting lines Y-CL can be disposed to overlap the banks BANK. Accordingly, the aperture ratio can be prevented from being decreased by the Y-touch electrode connecting lines Y-CL.

The X-touch electrode lines X-TEL can comprise the plurality of X-touch electrodes X-TE and the plurality of X-touch electrode connecting lines X-CL electrically connecting the plurality of X-touch electrodes X-TE. The plurality of X-touch electrodes X-TE and the plurality of X-touch electrode connecting line X-CL can be disposed on different layers, on both sides of the touch insulating film T-ILD.

The plurality of X-touch electrodes X-TE can be disposed on the touch insulating film T-ILD, spaced apart from each other by predetermined distances in the X-axis direction. Each of the plurality of X-touch electrodes X-TE can be electrically connected to the adjacent other X-touch electrodes X-TE through the X-touch electrode connecting lines X-CL in the X-axis direction.

The X-touch electrode connecting lines X-CL can be disposed on the same plane as the X-touch electrodes X-TE to be electrically connected to the two adjacent X-touch electrodes X-TE in the X-axis direction without separate contact holes or be integrated with the two adjacent X-touch electrodes X-TE in the X-axis direction.

The X-touch electrode connecting lines X-CL can be disposed to overlap the banks BANK. Accordingly, the aperture ratio can be prevented from being decreased by the X-touch electrode connecting lines X-CL.

In addition, the Y-touch electrode lines Y-TEL can be electrically connected to the touch driving circuit TDC through the Y-touch routing lines Y-TL and the Y-touch pads Y-TP. In the same manner, the X-touch electrode lines X-TEL can be electrically connected to the touch driving circuit TDC through the X-touch routing lines X-TL and the X-touch pads X-TP.

A pad cover electrode covering the X-touch pads X-TP and the Y-touch pads Y-TP can be further disposed.

The X-touch pads X-TP can be provided separately from the X-touch routing lines X-TL or be provided as extensions of the X-touch routing lines X-TL. The Y-touch pads Y-TP can be provided separately from the Y-touch routing lines Y-TL or be provided as extensions of the Y-touch routing lines Y-TL.

In a case in which the X-touch pads X-TP are extensions of the X-touch routing lines X-TL and the Y-touch pads Y-TP are extensions of the Y-touch routing lines Y-TL, the X-touch pads X-TP, the X-touch routing lines X-TL, the Y-touch pads Y-TP, and the Y-touch routing lines Y-TL can be comprised of the same material, i.e., a first conductive material. The first conductive material can have a single or multilayer structure made of a metal, such as Al, Ti, Cu, or Mo, having high corrosion resistance, high acid resistance, and high conductivity.

For example, each of the X-touch pads X-TP, the X-touch routing lines X-TL, the Y-touch pads Y-TP, and the Y-touch routing lines Y-TL comprised of the first conductive material can have a three-layer structure, such as Ti/Al/Ti or Mo/Al/Mo.

The pad cover electrode capable of covering the X-touch pads X-TP and the Y-touch pads Y-TP can be comprised of the same material as the X and Y-touch electrodes X-TE and Y-TE, i.e., a second conductive material. The second conductive material can be a transparent conductive material, such as indium tin oxide (ITO) or indium zinc oxide (IZO), having high corrosion resistance and acid resistance. The pad cover electrodes can be provided to be exposed from the touch buffer film T-BUF so as to be bonded to the touch driving circuit TDC or to a circuit film on which the touch driving circuit TDC is mounted.

The touch buffer film T-BUF can be provided to cover the touch sensor metal TSM so as to prevent the touch sensor metal TSM from being corroded by external moisture. For example, the touch buffer film T-BUF can be made of an organic insulating material or be provided as a circular polarizer or a film made of an epoxy or acrylic material. The touch buffer film T-BUF may not be provided on the encapsulation layer ENCAP. For example, the touch buffer film T-BUF may not be an essential component.

The Y-touch routing lines Y-TL can be electrically connected to the Y-touch electrodes Y-TE via touch routing line contact holes or be integrated with the Y-touch electrodes Y-TE.

Each of the Y-touch routing lines Y-TL can extend to the non-active area NA, past the top and side portions of the encapsulation layer ENCAP and the dams DAM, so as to be electrically connected to the Y-touch pads Y-TP. Accordingly, the Y-touch routing lines Y-TL can be electrically connected to the touch driving circuit TDC through the Y-touch pads Y-TP.

The Y-touch routing lines Y-TL can deliver the touch-sensing signal from the Y-touch electrodes Y-TE to the touch driving circuit TDC or deliver the touch driving signal, received from the touch driving circuit TDC, to the Y-touch electrodes Y-TE.

The X-touch routing lines X-TL can be electrically connected to the X-touch electrodes X-TE via the touch routing line contact holes or be integrated with the X-touch electrodes X-TE.

The X-touch routing lines X-TL can extend to the non-active area NA, past the top and side portions of the encapsulation layer ENCAP and the dams DAM, so as to be electrically connected to the X-touch pads Y-TP. Accordingly, the X-touch routing lines X-TL can be electrically connected to the touch driving circuit TDC through the X-touch pads X-TP.

The X-touch routing lines X-TL can deliver the touch driving signal, received from the touch driving circuit TDC, to the X-touch electrodes X-TE or deliver touch-sensing signal from the X-touch electrodes X-TE to the touch driving circuit TDC.

The arrangement of the X-touch routing lines X-TL and the Y-touch routing lines Y-TL can be modified variously depending on the design specification of the panel.

A touch protective film PAC can be disposed on the X-touch electrodes X-TE and the Y-touch electrodes Y-TE. The touch protective film PAC can extend to an area in front of or behind the dams DAM so as to be disposed on the X-touch routing lines X-TL and the Y-touch routing lines Y-TL.

The cross-sectional diagram of FIG. 9 is conceptual illustration of the structure. The positions, thicknesses, or widths of the patterns (e.g., various layers or electrodes) can vary depending on the direction or position of view, the structures for connecting the patterns can be modified, additional layers other than the plurality of illustrated layers can be further provided, and some of the plurality of illustrated layers can be omitted or integrated. For example, the width of the banks BANK can be narrower than that illustrated in the drawings, and the height of the dams DAM can be lower or higher than that illustrated in the drawings.

In addition, the cross-sectional diagram of FIG. 9 illustrates a structure in which the touch electrode TE, the touch routing lines TL, and the like are disposed on the entirety of the subpixels SP in order to illustrate a structure connected to the touch pads TP along inclines of the touch routing lines TL and the encapsulation layer ENCAP. However, in a case in which the touch electrode TE or the like is mesh-shaped as described above, the open areas OA of the touch electrode TE can be located above the emitting areas of the subpixels SP. In addition, a color filter CF (see FIGS. 10 and 11) can be further disposed on the encapsulation layer ENCAP. The color filter CF can be located on the touch electrode TE or between the encapsulation layer ENCAP and the touch electrode TE.

Furthermore, in the case that the non-active area NA of the display panel DISP is bent, an area where the display panel DISP is bent can be present between the touch pad TP and the dam DAM. The touch pad TP can be located between the area where the display panel DISP is bent and an outer boundary of the display panel DISP on the non-active area NA of the display panel DISP.

Figure 10:
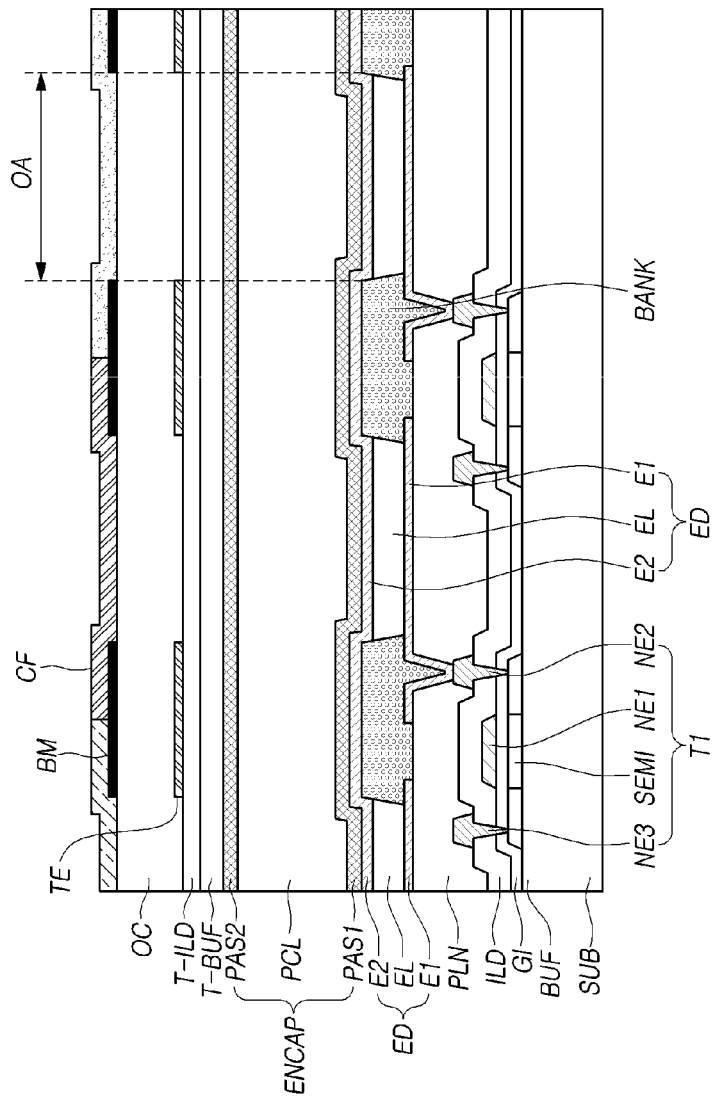
FIGS. 10 and 11 are diagrams illustrating a cross-sectional structure of a display panel according to embodiments of the present disclosure, including a color filter.
Figure 11:
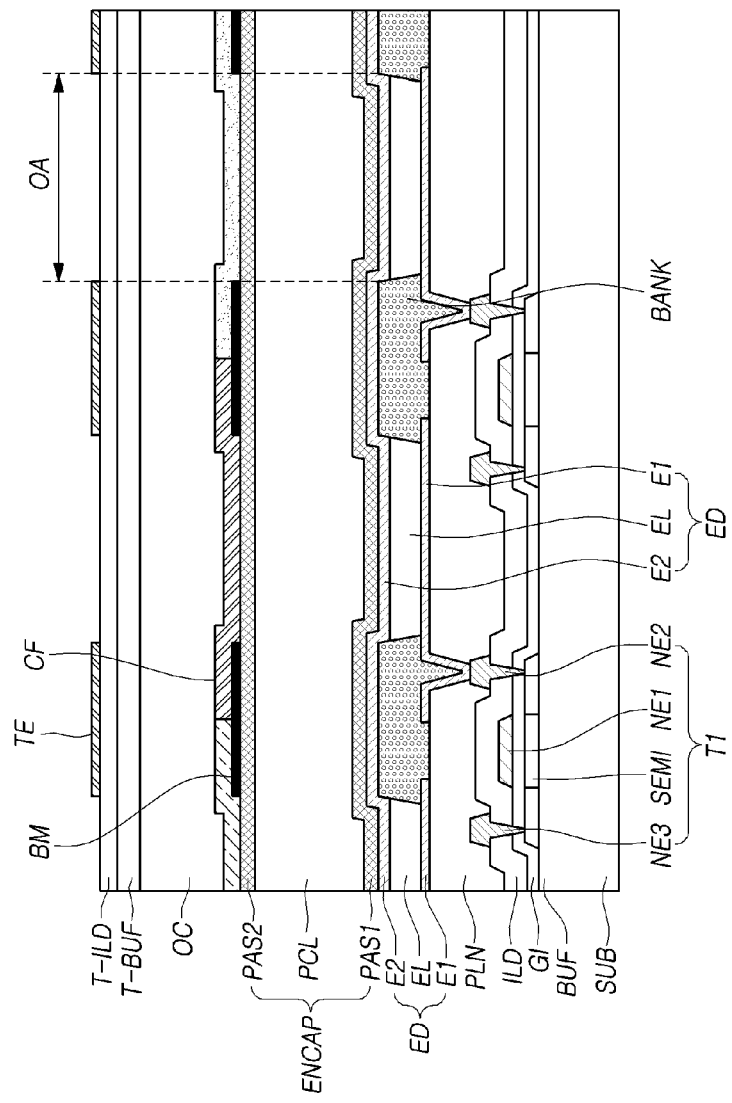

FIGS. 10 and 11 are diagrams illustrating a cross-sectional structure of the display panel DISP according to embodiments of the present disclosure, including the color filter CF.

Referring to FIGS. 10 and 11, in a case in which the touch panel TSP is disposed within the display panel DISP and the display panel DISP is provided as an OLED display panel, the touch panel TSP can be located on the encapsulation layer ENCAP in the display panel DISP. For example, the touch sensor metals TSM, such as the plurality of touch electrodes TE and the plurality of touch routing lines TL, can be located on the encapsulation layer ENCAP in the display panel DISP.

The touch electrode TE being provided on the encapsulation layer ENCAP as described above can be made as the touch electrode TE without significantly influencing the display performance or the formation of a display-related layer.

Referring to FIGS. 10 and 11, the second electrode E2 that can be the cathode of the OLED can be located below the encapsulation layer ENCAP.

The thickness T of the encapsulation layer ENCAP can be, for example, 1 µm or more.

Since the thickness of the encapsulation layer ENCAP is designed to be 1 µm or more as described above, parasitic capacitance generated between the second electrode E2 and the touch electrodes TE of the OLED can be reduced, thereby preventing touch sensitivity from being reduced by the parasitic capacitance.

As described above, each of the plurality of touch electrodes TE is patterned in the shape of a mesh, in which the electrode metal EM has two or more open areas OA. Each of the two or more open areas OA can correspond to one or more subpixels or the emitting areas thereof when viewed in a vertical direction.

As described above, the electrode metal EM of the touch electrode TE can be patterned such that the emitting area of one or more subpixels SP is provided in a position corresponding to each of the two or more open areas OA present in the area of the touch electrode TE when viewed in a plan view. Accordingly, the luminous efficiency of the display panel DISP can be improved.

As illustrated in FIGS. 10 and 11, a black matrix BM can be provided in the display panel DISP. The color filter CF can be further provided in the display panel DISP.

The position of the black matrix BM can correspond to the position of the electrode metal EM of the touch electrode TE.

The positions of the plurality of color filters CF correspond to the positions of the plurality of touch electrodes TE or the position of the electrode metal EM constituting the plurality of touch electrodes TE.

Since the plurality of color filters CF are located in positions corresponding to the plurality of open areas OA as described above, the luminous performance of the display panel DISP can be improved.

The vertical positional relationship between the plurality of color filters CF and the plurality of touch electrodes TE will be described as follows.

As illustrated in FIG. 10, the plurality of color filters CF and the black matrix BM can be located on the plurality of touch electrodes TE.

In this case, the plurality of color filters CF and the black matrix BM can be located on the overcoat layer OC disposed on the plurality of touch electrodes TE. Here, the overcoat layer OC can be the same layer as or a different layer from the touch protective film PAC illustrated in FIG. 9.

Alternatively, as illustrated in FIG. 11, the plurality of color filters CF and the black matrix BM can be located below the plurality of touch electrodes TE.

In this case, the plurality of touch electrodes TE can be located on the overcoat layer OC on the plurality of color filters CF and the black matrix BM. The overcoat layer OC can be the same layer as or a different layer from the touch buffer film T-BUF or the touch insulating film T-ILD illustrated in FIG. 9. Alternatively, the touch buffer film T-BUF or the touch insulating film T-ILD can be disposed in a manner separate from the overcoat layer OC.

Due to the vertical positional relationship between the touch electrode TE and a display driving configuration being adjusted as described above, a touch sensing configuration can be disposed without degrading the display performance.

In addition, embodiments of the present disclosure can enhance the performance of touch sensing performed on the basis of capacitance by using various structures of the X-touch electrode X-TE and the Y-touch electrode Y-TE forming a capacitance.

Figure 12:
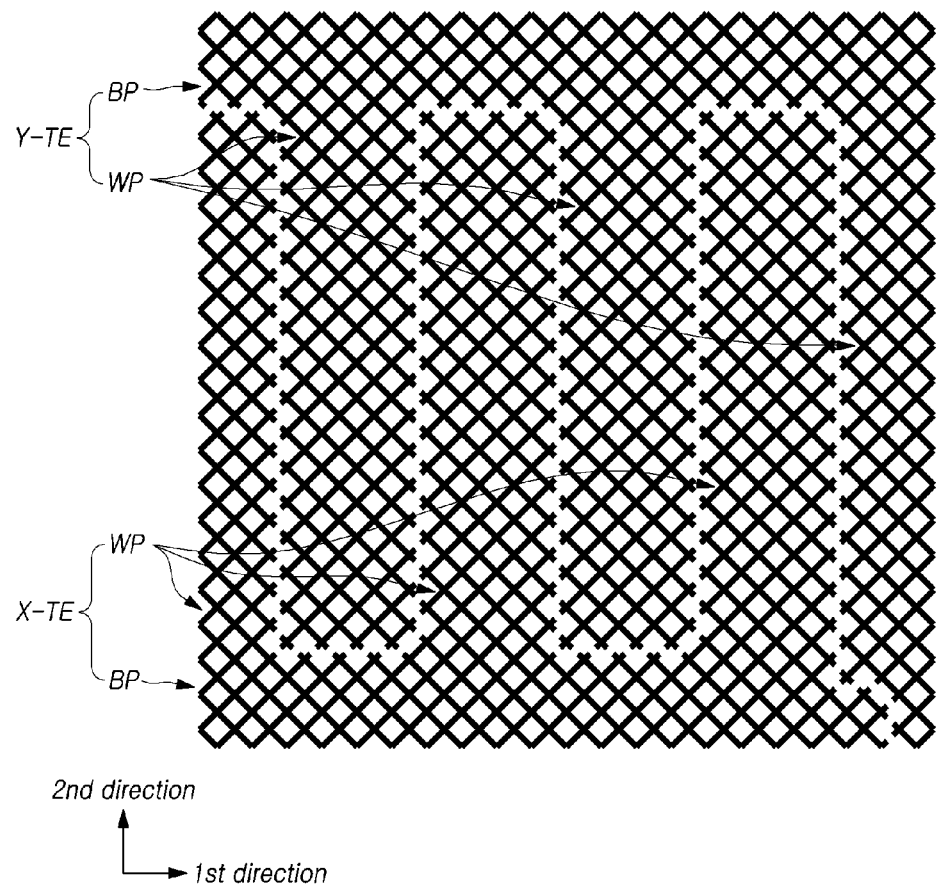
FIG. 12 is a diagram illustrating an example of a shape of a touch electrode disposed on a display panel according to embodiments of the present disclosure.

FIG. 12 is a diagram illustrating an example of a shape of a touch electrode TE disposed on a display panel DISP according to embodiments of the present disclosure.

Particularly, FIG. 12 illustrates an example of a structure in which a X-touch electrode X-TE is located on the lower side and a Y-touch electrode Y-TE is located on the upper side, but the X-touch electrode X-TE and the Y-touch electrode Y-TE can be arranged in reverse.

The X-touch electrode X-TE can include at least one body portion BP and a plurality of wing portions WP. In addition, the Y-touch electrode Y-TE can include at least one body portion BP and a plurality of wing portions WP.

The body portion BP of the X-touch electrode X-TE can be disposed along one direction, for example, along a first direction.

The wing portion WP of the X-touch electrode X-TE can be disposed to extend from one side of the body portion BP of the X-touch electrode X-TE. The wing portion WP of the X-touch electrode X-TE can be disposed along a direction crossing or intersecting the body portion BP of the X-touch electrode X-TE, for example, can be disposed along a second direction.

The body portion BP of the Y-touch electrode Y-TE can be disposed along the first direction, similar to the body portion BP of the X-touch electrode X-TE.

The wing portion WP of the Y-touch electrode Y-TE can be disposed to extend from one side of the body portion BP of the Y-touch electrode Y-TE. For example, the wing portion WP of the Y-touch electrode Y-TE can be disposed along the second direction.

The example shown in FIG. 12 illustrates one side of the body portion BP to which the wing portion WP of the touch electrode TE is connected, however, the wing portion WP of the touch electrode TE can also be connected to the other side of the body portion BP. The touch electrode TE can have a shape in which the wing portions WP are connected to both sides of the body portion BP.

The plurality of wing portions WP of the X-touch electrode X-TE can be disposed in a form in engagement with the plurality of wing portions WP of the Y-touch electrode Y-TE.

Since the wing portion WP of the X-touch electrode X-TE and the wing portion WP of the Y-touch electrode Y-TE are arranged in an engagement form or an interlocking form, there can increase an area forming a capacitance between the X-touch electrode X-TE and the Y-touch electrode Y-TE.

Accordingly, it is possible to increase the performance of touch sensing, and for example, even when the touch area is small, such as a pen touch, by increasing the touch sensing sensitivity, thereby improving the performance of the touch sensing.

In addition, parasitic capacitance can be reduced and touch sensing performance can be improved by disposing a dummy metal DM inside the touch electrode TE in the structure of the touch electrode TE described above.

Figure 13:
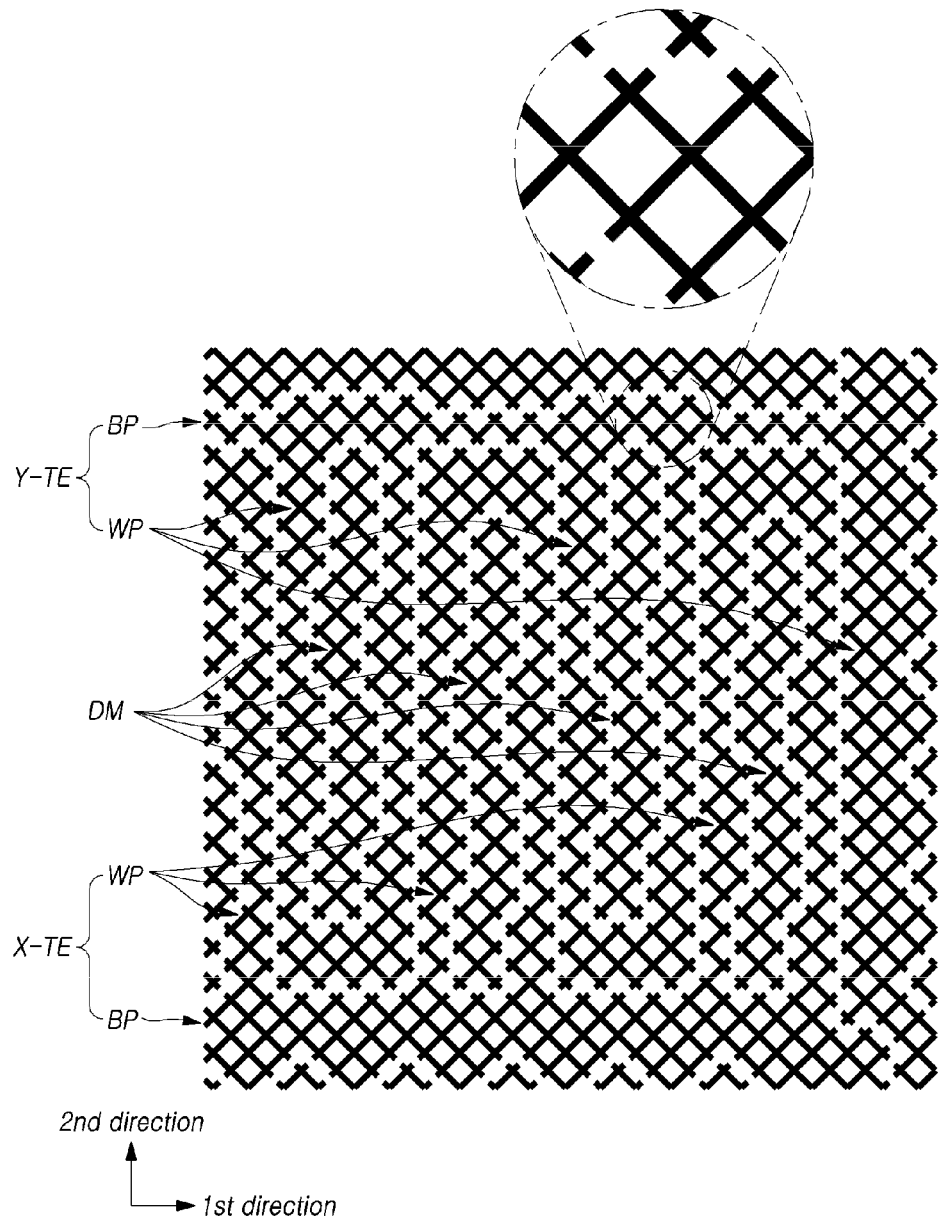
FIG. 13 is a diagram illustrating another example of a shape of a touch electrode disposed on a display panel according to embodiments of the present disclosure.

FIG. 13 is a diagram illustrating another example of a shape of a touch electrode TE disposed on a display panel DISP according to embodiments of the present disclosure.

Referring to FIG. 13, each of a X-touch electrode X-TE and a Y-touch electrode Y-TE can include at least one body portion BP and a plurality of wing portions WP. The plurality of wing portions WP of the X-touch electrode X-TE and the plurality of wing portions WP of the Y-touch electrode Y-TE can be disposed to be engaged with each other or an interlocking form.

At least one dummy metal DM can be disposed inside each of the X-touch electrode X-TE and the Y-touch electrode Y-TE.

The dummy metal DM, for example, can be located inside the wing portion WP of the X-touch electrode X-TE. The dummy metal DM, for example, can be located inside the wing portion WP of the Y-touch electrode Y-TE.

The dummy metal DM can be in a floating state to which no electrical signal is applied.

The performance of touch sensing can be improved by reducing the parasitic capacitance formed by the touch electrode TE by forming the dummy metal DM inside the X-touch electrode X-TE and the Y-touch electrode Y-TE.

The dummy metal DM disposed inside the touch electrode TE can be formed by cutting an electrode metal EM similarly to the touch electrode TE.

In order to prevent a cutting area between the dummy metal DM and the touch electrode TE from being visually recognized, the electrode metal EM can be formed by cutting the electrode metal EM so as for the dummy metal DM to have a zigzag shape.

Accordingly, the parasitic capacitance can be reduced by the formation of the dummy metal DM, and it is possible to prevent a phenomenon in which an outline of the cut dummy metal DM is visually recognized.

In addition, in an embodiment of the present disclosure, the method of cutting the wing portion WP of the touch electrode TE and the method of cutting the dummy metal DM can be different from the above-described examples, so that it is possible to improve the visibility problem of the cutting area of the electrode metal EM while maintaining or improving the touch sensing performance.

Figure 14:
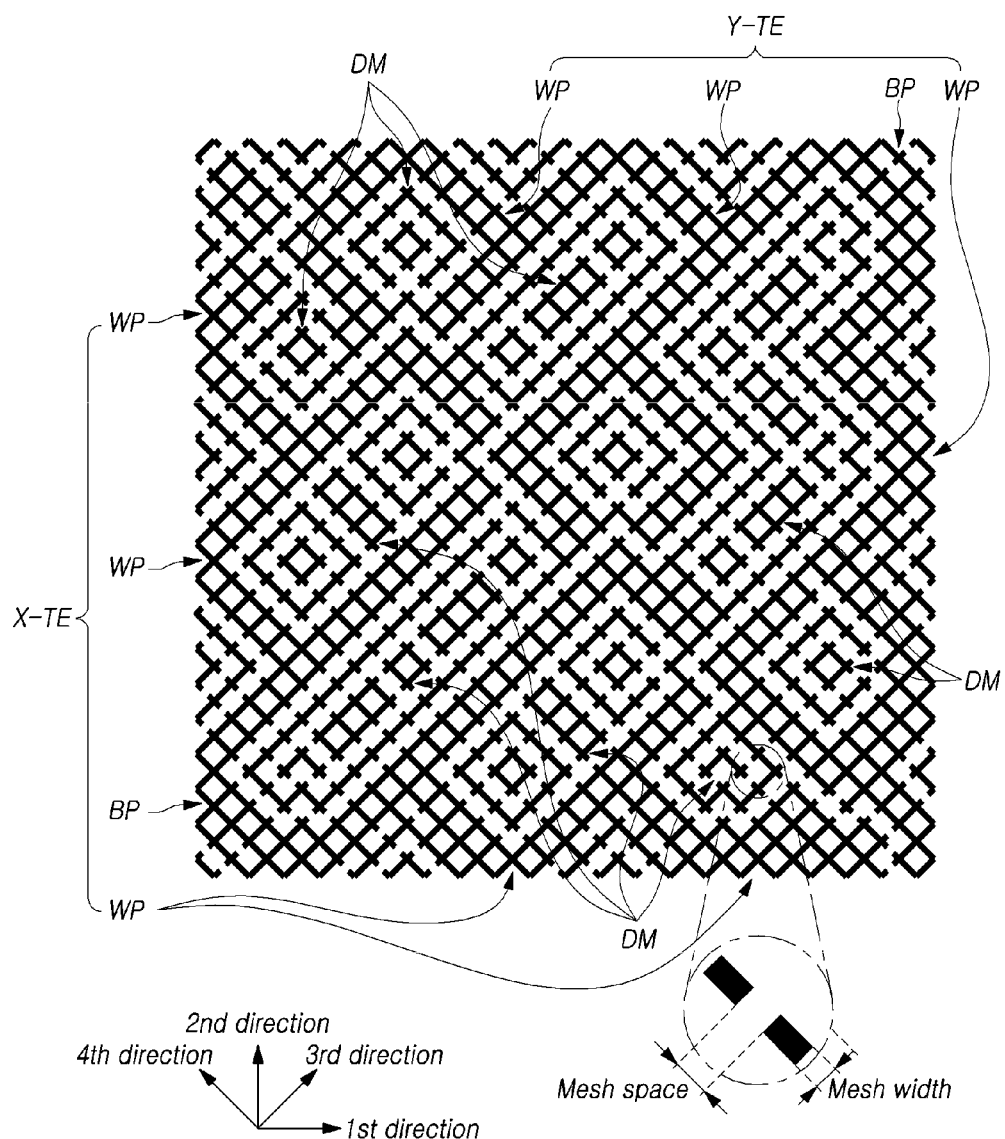
FIG. 14 is a diagram illustrating another example of a shape of a touch electrode disposed on a display panel according to embodiments of the present disclosure.

FIG. 14 is a diagram illustrating another example of a shape of a touch electrode TE disposed on a display panel DISP according to embodiments of the present disclosure.

Referring to FIG. 14, each of a X-touch electrode X-TE and a Y-touch electrode Y-TE can include at least one body portion BP and a plurality of wing portions WP.

The body portion BP of the touch electrode TE can be disposed in a direction different from the first direction and the second direction. For example, the body portion BP of the touch electrode TE can be disposed along a fourth direction.

The wing portion WP of the touch electrode TE can be connected to at least one side of the body portion BP of the touch electrode TE.

The wing portion WP of the touch electrode TE can be disposed along a direction intersecting a direction of arranging the body portion BP of the touch electrode TE. The wing portion WP of the touch electrode TE, for example, can be disposed along a third direction.

The plurality of wing portions WP of the X-touch electrode X-TE and the plurality of wing portions WP of the Y-touch electrode Y-TE can be disposed in an engagement form or an interlocking form with each other.

The body portion BP and the wing portion WP of the touch electrode TE can be formed by cutting along a direction in which a mesh-type electrode metal EM forming the touch electrode TE is disposed.

Accordingly, since a shape formed by cutting can be similar to an arrangement shape of the electrode metal EM, and thus it is possible to reduce or prevent a cut area of the electrode metal EM from being recognized.

The size of a mesh space formed by cutting the electrode metal EM can be determined in consideration of a capacitance formed by the touch electrode TE or visibility. The size of the mesh space formed by cutting the electrode metal EM can be, for example, larger than a width (i.e., a mesh width) of the electrode metal EM. Alternatively, in some cases, the size of the mesh space formed by cutting the electrode metal EM can be the same as the mesh width of the electrode metal EM, or can be smaller than the mesh width of the electrode metal EM.

Since cutting is performed along the arrangement direction of the electrode metal EM to form the body portion BP and the wing portion WP of the touch electrode TE, it is possible to enhance the touch sensing performance while improving the visibility of the touch electrode TE.

In addition, the wing portion WP of the touch electrode TE can be disposed in various structures, so that touch sensing performance can be enhanced and visibility of the touch electrode TE can be further improved.

Figure 15:
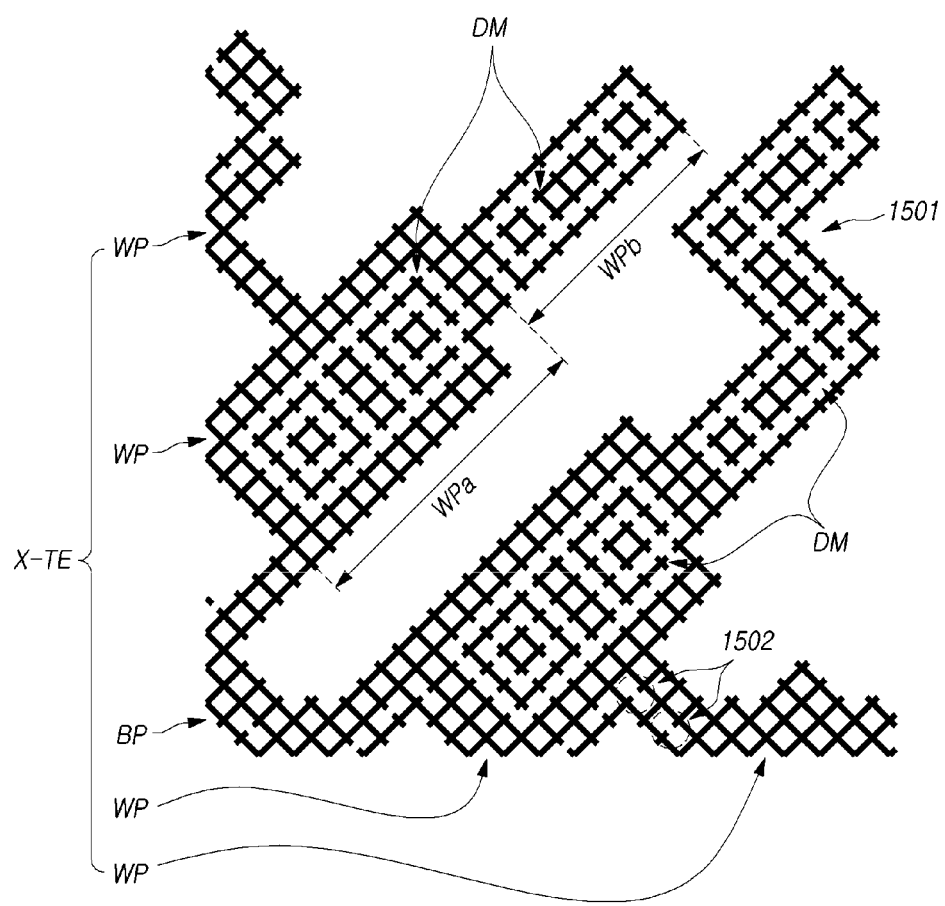
FIGS. 15 and 16 are diagrams illustrating a part of the touch electrode shown in FIG. 14.
Figure 16:
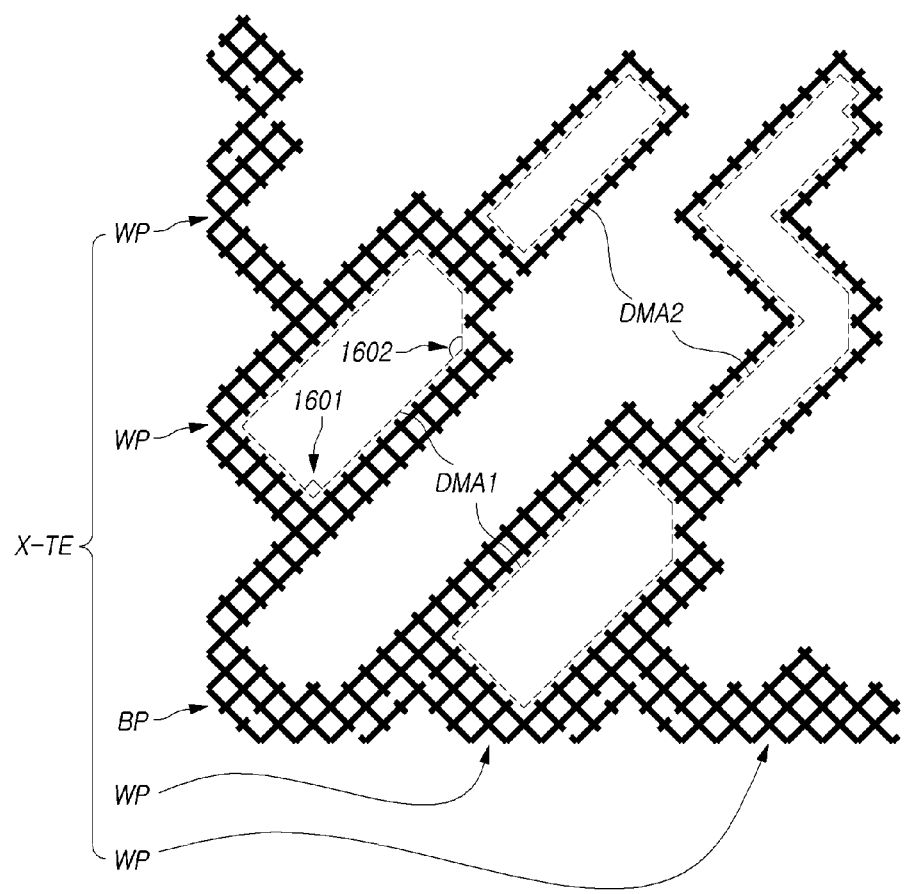

FIGS. 15 and 16 are diagrams illustrating a part of the touch electrode TE shown in FIG. 14. The description to be described later with reference to FIGS. 15 and 16 will be described using a X-touch electrode X-TE as an example, but can also be applied to a Y-touch electrode Y-TE.

Referring to FIG. 15, a X-touch electrode X-TE can include at least one body portion BP and a plurality of wing portions WP.

At least two wing portions WP among the plurality of wing portions WP included in the X-touch electrode X-TE can have different lengths. The lengths of the plurality of wing portions WP included in the X-touch electrode X-TE may not be uniform.

At least one wing portion WP among the plurality of wing portions WP included in the X-touch electrode X-TE can include at least two or more portions having different widths.

For example, the wing portion WP of the X-touch electrode X-TE can include a first portion WPa having a first width and a second portion WPb having a second width. The first width of the first portion WPa of the wing portion WP can be greater than the second width of the second portion WPb of the wing portion WP.

The length of the first portion WPa of the wing portion WP can be different from the length of the second portion WPb of the wing portion WP. The length of the first portion WPa of the wing portion WP can be greater, or the length of the second portion WPb of the wing portion WP can be greater.

At least one wing portion WP among the plurality of wing portions WP included in the X-touch electrode X-TE can include a bent structure as shown in 1501. In addition, in some cases, at least one body portion BP included in the X-touch electrode X-TE can also include a bent structure.

The at least one body portion BP and a plurality of wing portions WP included in the X-touch electrode X-TE can be formed in various and irregular structures, so that it is possible to increase the capacitance formed with the Y-touch electrode Y-TE and prevent the cutting area of the electrode metal EM from being visually recognized.

The X-touch electrode X-TE can include a cutting area positioned inside the X-touch electrode X-TE to improve visibility of the cutting area of the electrode metal EM.

For example, as shown in the area indicated by 1502, the cutting area can be located inside the X-touch electrode X-TE.

A plurality of dummy metals DM can be disposed inside the X-touch electrode X-TE to reduce parasitic capacitance.

The plurality of dummy metals DM, for example, can be disposed inside the plurality of wing portions WP of the X-touch electrode X-TE.

A part of the plurality of dummy metals DM can be disposed inside a first portion WPa of the wing portion WP. A part of the plurality of dummy metals DM can be disposed inside a second portion WPb of the wing portion WP.

A portion of the touch electrode TE can be located between the dummy metal DM disposed inside the first portion WPa of the wing portion WP and the dummy metal DM disposed inside the second portion WPb of the wing portion WP. The dummy metal DM disposed inside the first portion WPa of the wing portion WP and the dummy metal DM disposed inside the second portion WPb of the wing portion WP can be disposed to be spaced apart by an electrode metal EM which is a part of the touch electrode TE.

At least one of a shape and a size of an area in which the dummy metal DM is disposed inside the X-touch electrode X-TE may not be uniform.

At least one of a shape and a size of the dummy metal DM disposed inside the X-touch electrode X-TE may not be uniform.

By non-uniformly forming the cutting area between the X-touch electrode X-TE and the dummy metal DM and the cutting area between the dummy metals DM, it is possible to prevent the cutting area of the electrode metal EM from being visually recognized.

Referring to FIGS. 15 and 16, a first dummy area DMA1 can be located inside the first portion WPa of the wing portion WP of the X-touch electrode X-TE.

A second dummy area DMA2 can be located inside the second portion WPb of the wing portion WP of the X-touch electrode X-TE.

The shape of the first dummy area DMA1 and the shape of the second dummy area DMA2 can be different.

The size of the first dummy area DMA1 can be different from the size of the second dummy area DMA2.

The shape or size of the dummy area DMA can be formed according to the shape or size of the wing portion WP of the X-touch electrode X-TE.

For example, the width of the first dummy area DMA1 located inside the first portion WPa of the wing portion WP of the X-touch electrode X-TE can be greater than the width of the second dummy area DMA2 located inside the second portion WPb of the wing portion WP of the X-touch electrode X-TE.

The dummy area DMA can be formed by cutting the electrode metal EM inside the X-touch electrode X-TE. In addition, the dummy area DMA can be formed by cutting the electrode metal EM while maintaining the connection structure of the X-touch electrode X-TE.

The outer edge of the dummy area DMA can include, for example, at least two or more corners orthogonal to each other, such as a portion indicated by 1601.

The outer edge of the dummy area DMA can include, as another example, at least two or more corners forming an obtuse angle with each other, as shown in a portion indicated by 1602.

By forming the dummy metal DM by cutting the electrode metal EM while maintaining the connection structure of the X-touch electrode X-TE, it is possible to reduce parasitic capacitance and maintain touch sensing performance.

The plurality of dummy metals DM disposed in the dummy area DMA can be formed by cutting in an irregular shape.

Accordingly, the plurality of dummy metals DM disposed in the dummy area DMA can have various sizes and shapes. In addition, the number of dummy metals DM disposed in one dummy area DMA may not be constant.

As described above, in the touch display device according to the embodiments of the present disclosure, the body portion BP and the wing portion WP of the touch electrode X-TE is formed by cutting the electrode metal EM along the arrangement direction of the electrode metal EM, so that it is possible to enhance the performance of touch sensing by improving visibility of the cutting area of the electrode metal EM.

Further, by forming various structures of the wing portion WP of the touch electrode TE, it is possible to improve visibility of the cutting area of the electrode metal EM.

By arranging a plurality of dummy metals DM irregularly cut and formed inside the touch electrode TE, it is possible to enhance the performance of touch sensing by improving visibility of the cutting area of the electrode metal EM and reducing the parasitic capacitance.

In the touch display device according to embodiments of the present disclosure, a predetermined pattern is formed on the electrode metal EM according to the structure of the touch electrode line TEL capable of reducing the load on the touch electrode line TEL, so that it is possible to enhance the touch sensing performance and improve visibility.

Figure 17:
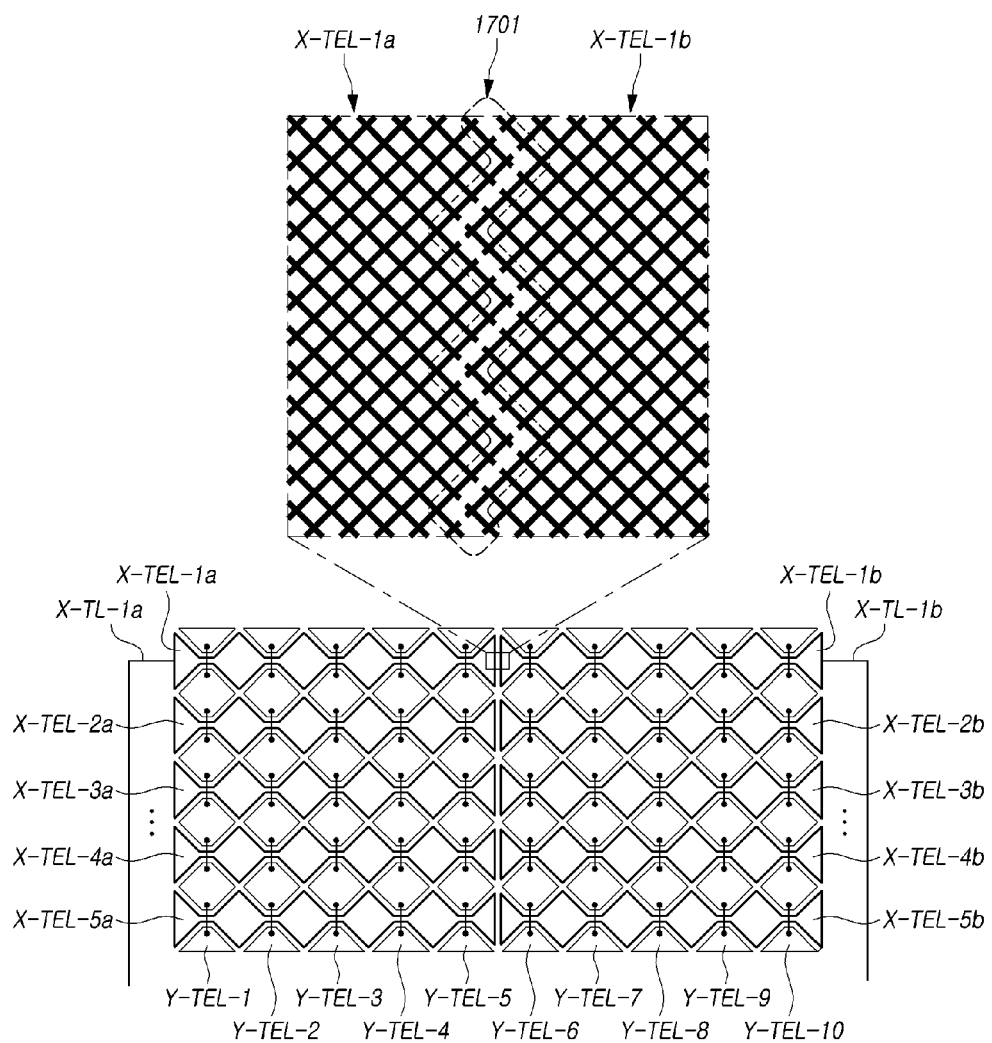
FIG. 17 is a diagram illustrating an example of a shape of a touch electrode line disposed on a display panel according to embodiments of the present disclosure.

FIG. 17 is a diagram illustrating an example of a shape of a touch electrode line TEL disposed on a display panel DISP according to embodiments of the present disclosure.

Referring to FIG. 17, a part of a plurality of touch electrodes TE disposed on a display panel DISP can form a plurality of X-touch electrode lines X-TEL. Another part of the plurality of touch electrodes TE disposed on the display panel DISP can form a plurality of Y-touch electrode lines Y-TEL.

FIG. 17 illustrates, for convenience of explanation, five X-touch electrode lines X-TEL-1, X-TEL-2, X-TEL-3, X-TEL-4 and X-TEL-5, and ten Y-touch electrode lines Y-TEL-1, Y-TEL-2, Y-TEL-3, Y-TEL-4, Y-TEL-5, Y-TEL-6, Y-TEL-7, Y-TEL-8, Y-TEL-9 and Y-TEL-10 as an example, however, the arrangement structure of the touch electrode line TEL is not limited thereto.

At least one touch electrode line TEL of the plurality of X-touch electrode lines X-TEL and the plurality of Y-touch electrode lines Y-TEL can include a first electrode line portion TEL-a and a second electrode line portion TEL-b.

As an example, each of the plurality of X-touch electrode lines X-TEL can include a first electrode line portion X-TEL-a and a second electrode line portion X-TEL-b.

If a first X-touch electrode line X-TEL-1 is described as an example, the first X-touch electrode line X-TEL-1 can include a first electrode line portion X-TEL-1a and a second electrode line portion X-TEL-1b.

The first electrode line portion X-TEL-1a of the first X-touch electrode line X-TEL-1 can be disposed separately from the second electrode line portion X-TEL-1b of the first X-touch electrode line X-TEL-1.

The first electrode line portion X-TEL-1a of the first X-touch electrode line X-TEL-1 can be electrically connected to a first line X-TL-1a of a first X-touch routing line X-TL-1. The second electrode line portion X-TEL-1b of the first X-touch electrode line X-TEL-1 can be electrically connected to a second line X-TL-1b of the first X-touch routing line X-TL-1.

The first line X-TL-1a of the first X-touch routing line X-TL-1 can be a different line from the second line X-TL-1b of the first X-touch routing line X-TL-1.

The first electrode line portion X-TEL-1*a* of the first X-touch electrode line X-TEL-1 and the first line X-TL-1*a* of the first X-touch routing line X-TL-1 can have a structure separated from the second electrode line portion X-TEL-1*b* of the first X-touch electrode line X-TEL-1 and the second line X-TL-1*b* of the first X-touch routing line X-TL-1.

Accordingly, it is possible to increase the touch sensing performance by reducing the load of the first X-touch electrode line X-TEL-1.

The boundary between the first electrode line portion X-TEL-1*a* of the first X-touch electrode line X-TEL-1 and the second electrode line portion X-TEL-1*b* of the first X-touch electrode line X-TEL-1 can be, as indicated by 1701, formed in a shape in which the electrode metal EM is cut along the arrangement direction of the electrode metal EM.

In the touch display device according to the embodiments of the present disclosure, the touch electrode line TEL includes a pattern corresponding to a boundary between the first electrode line portion TEL-a and the second electrode line portion TEL-b, so that it is possible to improve a phenomenon in which a boundary between electrode line portions is visually recognized in the divided structure of the touch electrode line TEL.

Figure 18:
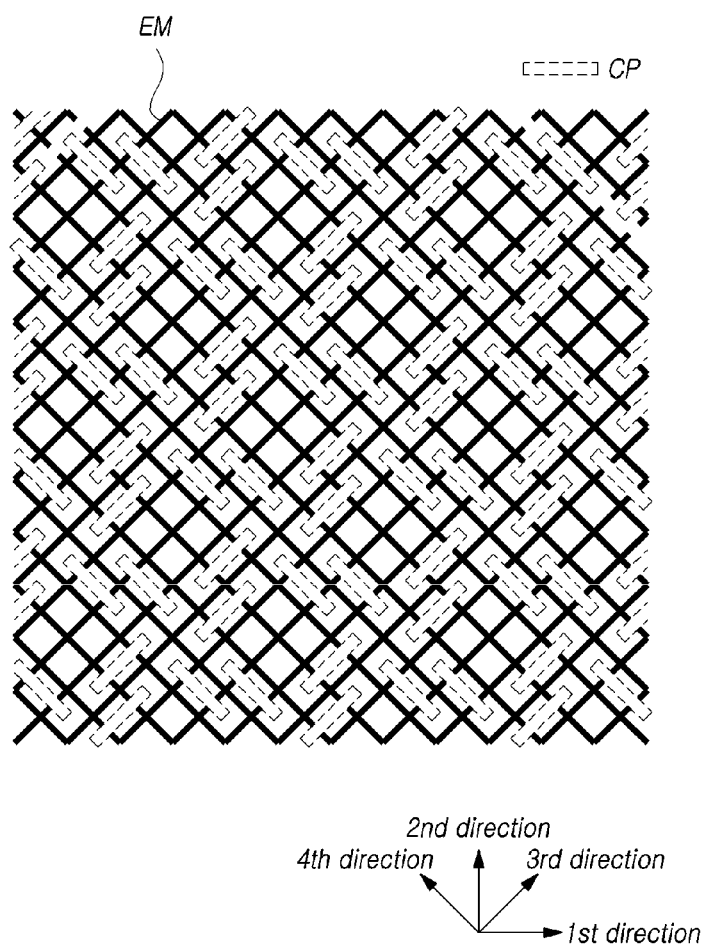
FIG. 18 is a diagram illustrating an example of the shape of an electrode metal forming a touch electrode line disposed on a display panel according to embodiments of the present disclosure.

FIG. 18 is a diagram illustrating an example of the shape of an electrode metal EM forming a touch electrode line TEL disposed on a display panel DISP according to embodiments of the present disclosure.

Referring to FIG. 18, an electrode metal EM forming a touch electrode line TEL can include a plurality of cutting patterns CP.

The plurality of cutting patterns CP can refer to patterns repeatedly formed by cutting the electrode metal EM.

The plurality of cutting patterns CP, for example, can be formed by cutting the electrode metal EM in a direction in which the electrode metal EM is disposed.

A part of the plurality of cutting patterns CP can be disposed along a third direction. Other part of the plurality of cutting patterns CP can be disposed along a fourth direction intersecting the third direction.

Each of the plurality of cutting patterns CP can be disposed in a structure surrounded by the electrode metal EM.

The plurality of cutting patterns CP can be arranged in a structure separated from each other by the electrode metal EM.

There can be formed a divided structure of the touch electrode line TEL by cutting in a manner of connecting some of the plurality of cutting patterns CP in a state in which the plurality of cutting patterns CP are formed on the electrode metal EM. Alternatively, the divided structure of the touch electrode line TEL can be formed by cutting the electrode metal EM to correspond to the shape of the cutting pattern CP.

Figure 19:
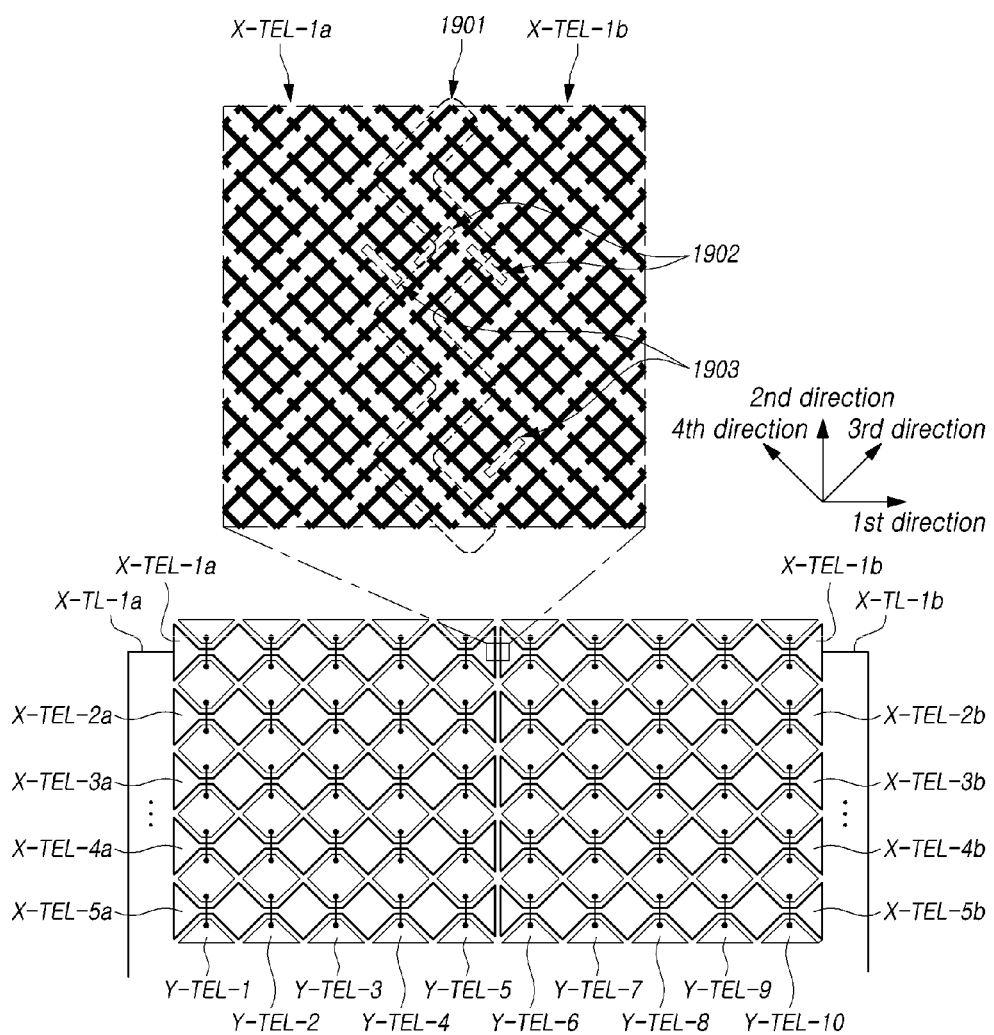
FIG. 19 is a diagram illustrating another example of a shape of a touch electrode line disposed on a display panel according to embodiments of the present disclosure.

FIG. 19 is a diagram illustrating another example of a shape of a touch electrode line TEL disposed on a display panel DISP according to embodiments of the present disclosure. Particularly, FIG. 19 illustrates an example in which a divided structure of the touch electrode line TEL is formed using the electrode metal EM including the plurality of cutting patterns CP shown in FIG. 18.

Referring to FIG. 19, the division structure between a first electrode line portion X-TEL-1*a* and a second electrode line portion X-TEL-1*b* of a first X-touch electrode line X-TEL-1 can be formed, as a portion indicated by 1901, by cutting an electrode metal EM along the arrangement direction of the electrode metal EM.

The first electrode line portion X-TEL-1*a* and the second electrode line portion X-TEL-1*b* of the first X-touch electrode line X-TEL-1 can be divided by cutting in a manner of connecting some of the plurality of cutting patterns CP included in the first X-touch electrode line X-TEL-1.

The divided structure of the first electrode line portion X-TEL-1*a* and the second electrode line portion X-TEL-1*b* of the first X-touch electrode line X-TEL-1 is formed, so that, as indicated by 1902, some of the plurality of cutting patterns CP can meet a boundary between the first electrode line portion X-TEL-1*a* and the second electrode line portion X-TEL-1*b* of the first X-touch electrode line X-TEL-1.

In addition, the plurality of cutting patterns CP can be located, as a portion indicated by 1903, parallel to the boundary between the first electrode line portion X-TEL-1*a* and the second electrode line portions X-TEL-1*b* of the first X-touch electrode line X-TEL-1.

In a structure in which the X-touch electrode line X-TEL-1 is divided into the first electrode line portion X-TEL-1*a* and the second electrode line portion X-TEL-1*b*, a plurality of cutting patterns CP corresponding to the dividing boundary of the first X-touch electrode line X-TEL-1 are repeatedly formed inside the first X-touch electrode line X-TEL-1, so that it is possible to prevent the dividing boundary of the first X-touch electrode line X-TEL-1 from being recognized.

Accordingly, it is possible to improve the visibility of the touch electrode line TEL having the divided structure while reducing the load on the touch electrode line TEL by the divided structure of the touch electrode line TEL.

The above-described divided structure of the touch electrode line TEL has been described with the X-touch electrode line X-TEL as an example, but can also be applied to the Y-touch electrode line Y-TEL.

In addition, in the touch display device according to the embodiments of the present disclosure, in order to prevent a short circuit defect due to static electricity at the boundary of the touch electrode line TEL in the divided structure of the touch electrode line TEL, there can provide a structure in which at least a portion of the metal constituting the touch routing line TL is separated from the touch electrode line TEL.

FIG. 20 is a diagram illustrating an example of the structure of a touch routing line TL disposed on a display panel DISP according to embodiments of the present disclosure.

Referring to FIG. 20, as a portion indicated by 2001, there is illustrated an example of a portion in which a first electrode line portion X-TEL-1*a* of a first X-touch electrode line X-TEL-1 is connected to a first line X-TL-1*a* of the first X-touch routing line X-TL-1.

As an example, the touch routing line TL can include a first routing line portion TLa and a second routing line portion (TLb).

The first routing line portion TLa can be made of a first touch sensor metal TSM1. The first touch sensor metal TSM1 can mean, for example, a touch sensor metal located under the touch insulating film T-ILD.

The second routing line portion TLb can be made of a second touch sensor metal TSM2. The second touch sensor metal TSM2 can mean, for example, a touch sensor metal located on the touch insulating film T-ILD. Further, the second touch sensor metal TSM2 can be a touch sensor metal constituting the touch electrode line TEL.

The first routing line portion TLa can be disposed on a different layer than the layer on which a touch electrode line TEL is disposed. The second routing line portion TLb can be disposed on the same layer as the layer on which the touch electrode line TEL is disposed.

At least a portion of the second routing line portion TLb can be disposed in a structure physically separated from the touch electrode line TEL, as a portion indicated by 2002.

Since at least a portion of the second routing line portion TLb is physically separated from the touch electrode line TEL, there can be reduced the overall size of the electrode metal EM made of the second touch sensor metal TSM2.

Since the size of the electrode metal EM constituting the touch electrode line TEL is reduced, it is possible to prevent a short circuit defect from occurring between the electrode line portions in the divided area of the touch electrode line TEL due to a decrease in static electricity.

Accordingly, even if the protrusions of the electrode line portions in the divided area of the touch electrode line TEL are disposed to face each other, it is possible to prevent the short circuit defect due to the static electricity and easily form a divided structure of the electrode line TEL for reducing the load on the touch electrode line TEL.

At least a portion of the second routing line portion TLb physically separated from the touch electrode line TEL can be, for example, as in the portion indicated by 2003, electrically connected to the first routing line portion TLa through a contact hole.

The touch electrode line TEL can be electrically connected to a touch driving circuit TDC through the touch routing line TL formed by the first routing line portion TLa and the second routing line portion TLb.

In this way, at least a portion of the routing line portion disposed on the layer on which the touch electrode line TEL is disposed among the touch routing line TL electrically connected to the touch electrode line TEL can be disposed to be physically separated from the touch electrode line TEL. Accordingly, it is possible to form, in the divided area of the touch electrode line TEL, a divided structure of the touch electrode line TEL to reduce a load while preventing a short circuit defect due to static electricity.

According to the above-described embodiments of the present disclosure, the touch electrode TE is formed in a shape including at least one body portion BP and a plurality of wing portions WP, and the plurality of wing portions WP of the touch electrode TE are disposed to be interlocked or engaged with the plurality of wing portions WP of other touch electrodes TE. Accordingly, the performance of touch sensing can be enhanced by increasing an area in which capacitance is formed between the touch electrodes TE.

The body portion BP and the wing portion WP of the touch electrode TE are cut along a direction in which the electrode metal EM forming the touch electrode TE is disposed, and the wing portion WP of the touch electrode TE is formed in an irregular shape, so that the visibility of the touch electrode TE can be improved.

In addition, it is possible to prevent an increase in load due to parasitic capacitance by forming a dummy metal DM inside the touch electrode TE, and it is possible to improve the visibility by the dummy metal DM by irregularly forming the dummy metal DM.

In the case of a touch display device having a large area, it is possible to reduce the load of the touch electrode line TEL by dividing the touch electrode line TEL and driving the divided touch electrode line TEL with different touch routing lines TL.

In this case, a plurality of cutting patterns CP corresponding to the divided boundary of the touch electrode line TEL are formed inside the touch electrode line TEL, so that it is possible to prevent the divided boundary of the touch electrode line TEL from being visually recognized, and it is possible to reduce the load on the touch electrode line TEL to improve touch sensing performance.

The above description has been presented to enable any person skilled in the art to make and use the technical idea of the present disclosure, and has been provided in the context of a particular application and its requirements. Various modifications, additions and substitutions to the described embodiments will be readily apparent to those skilled in the art, and the general principles defined herein can be applied to other embodiments and applications without departing from the spirit and scope of the present disclosure. The above description and the accompanying drawings provide an example of the technical idea of the present disclosure for illustrative purposes only.

For example, the disclosed embodiments are intended to illustrate the scope of the technical idea of the present disclosure. Thus, the scope of the present disclosure is not limited to the embodiments shown, but is to be accorded the widest scope consistent with the claims. The scope of protection of the present disclosure should be construed based on the following claims, and all technical ideas within the scope of equivalents thereof should be construed as being included within the scope of the present disclosure.

What is claimed is:

1. A touch display device comprising:
   a substrate;
   at least one transistor on the substrate;
   an organic light-emitting diode on the at least one transistor;
   an encapsulation layer on the organic light-emitting diode;
   a touch buffer film on the encapsulation layer;
   a plurality of touch electrodes comprising at least one X-touch electrode and at least one Y-touch electrode on the touch buffer film, wherein each of the at least one X- touch electrode and the at least one Y-touch electrode comprises at least one body portion and a plurality of wing portions, and the plurality of wing portions of the X-touch electrode are disposed to engage with the plurality of wing portions of the Y-touch electrode;
   a black matrix on the plurality of touch electrodes;
   a plurality of color filters on the black matrix; and
   at least one dummy metal disposed inside each of the at least one X-touch electrode and the at least one Y-touch electrode,
   wherein at least one wing portion among the plurality of wing portions comprises a first dummy area having an outline defined by outskirts of electrode metal of a first portion, a second dummy area having an outline defined by outskirts of electrode metal of a second portion,
   wherein the first dummy area has a first shape, and the second dummy area has a second shape different from the first shape, and
   the at least one dummy metal comprises at least one first dummy metal disposed in the first dummy area and at least one second dummy metal disposed in the second dummy area.

2. The touch display device of claim 1, wherein the at least one dummy metal is positioned inside the plurality of wing portions of the at least one X-touch electrode and the plurality of wing portions of the at least one Y-touch electrode, respectively.

3. The touch display device of claim 1, wherein the at least one dummy metal is in a floating state in which an electrical signal is not applied.

4. The touch display device of claim 1, wherein the at least one dummy metal is formed to have a zigzag shape.

5. The touch display device of claim 1,
wherein the first dummy area is positioned inside the first portion,
wherein the second dummy area is positioned inside the second portion, and
wherein a size of the second dummy area different from a size of the first dummy area.

6. The touch display device of claim 1, wherein the encapsulation layer comprises at least one inorganic encapsulation layer and at least one organic encapsulation layer.

7. The touch display device of claim 1, wherein at least two of the plurality of wing portions of the X-touch electrode have different length.

8. The touch display device of claim 1, wherein the at least one wing portion among the plurality of wing portions comprises a first portion having a first width, and a second portion having a second width different from the first width,
the first dummy area is located inside the first portion, and
the second dummy area is located inside the second portion.

9. The touch display device of claim 1, wherein a portion of the touch electrode is located between the first dummy area and the second dummy area.

10. The touch display device of claim 1, wherein an outer edge of at least one of the first dummy area and the second dummy area comprises at least two or more corners comprising sides orthogonal to each other.

11. The touch display device of claim 1, wherein an outer edge of at least one of the first dummy area and the second dummy area comprises at least two or more corners comprising sides forming an obtuse angle with each other.

12. The touch display device of claim 1, wherein at least one of the at least one body portion and the plurality of wing portions comprises a bent structure.

13. The touch display device of claim 1, wherein at least two or more X-touch electrodes among the at least one X-touch electrodes is disposed adjacent to each other along a first direction,
at least two or more Y-touch electrodes among the at least one Y-touch electrodes is disposed adjacent to each other along a second direction, and
wherein the plurality of wing portions are arranged to extend along a third direction different from the first direction and the second direction.

14. The touch display device of claim 8, wherein a length of the first portion is different from a length of the second portion.

15. A touch display device comprising:
a substrate;
at least one transistor on the substrate;
an organic light-emitting diode on the at least one transistor;
an encapsulation layer on the organic light-emitting diode;
a plurality of X-touch electrode lines disposed on the encapsulation layer located in an active area and including a plurality of X-touch electrodes, at least two or more X-touch electrodes disposed adjacent to each other along a first direction among the plurality of X-touch electrodes being electrically connected to each other;
a plurality of Y-touch electrode lines disposed on the encapsulation layer and including a plurality of Y-touch electrodes, at least two or more Y-touch electrodes disposed adjacent to each other along a second direction intersecting the first direction among the plurality of Y-touch electrodes being electrically connected to each other;
a plurality of touch routing lines electrically connected to at least one of the plurality of X-touch electrode lines and the plurality of Y-touch electrode lines;
a black matrix on the plurality of Y-touch electrodes and the plurality of X-touch electrodes; and
a plurality of color filters on the black matrix,
wherein at least one touch routing line among the plurality of touch routing lines comprises:
a first routing line portion disposed on a layer different from a layer on which the X-touch electrode lines and the Y-touch electrode lines are disposed, and connected to a corresponding touch electrode line among the X-touch electrode lines and the Y-touch electrode lines through a first contact hole; and
a second routing line portion disposed on a same layer as a layer on which the X-touch electrode lines and Y-touch electrode lines are disposed, at least a portion of which is physically separated from the corresponding touch electrode line, and connected to the first routing line portion through a second contact hole,
wherein the second routing line portion overlaps the first routing line portion.

16. The touch display device of claim 15, wherein at least one touch routing line among the plurality of touch routing lines comprises:
a first electrode line portion and a second electrode line portion separated from the first electrode line portion; and
a plurality of cutting patterns corresponding to a portion of a boundary between the first electrode line portion and the second electrode line portion and shorter than the portion of the corresponding boundary.

17. The touch display device of claim 16, wherein at least two or more of the plurality of cutting patterns are separated from each other.

18. The touch display device of claim 16, wherein at least one of the plurality of cutting patterns is surrounded by an electrode metal constituting the touch electrode line.

19. The touch display device of claim 16, wherein at least one of the plurality of cutting patterns meets the boundary between the first electrode line portion and the second electrode line portion.

20. The touch display device of claim 16, wherein at least one of the plurality of cutting patterns is parallel to the boundary between the first electrode line portion and the second electrode line portion.

21. The touch display device of claim 16, wherein a part of the plurality of cutting patterns is arranged to extend in a third direction different from the first direction and the second direction, and another part of the plurality of cutting patterns is arranged to extend in a fourth direction intersecting the third direction.

22. The touch display device of claim 16,
wherein a touch routing line electrically connected to the first electrode line portion among the plurality of touch routing lines is different from a touch routing line electrically connected to the second electrode line portion among the plurality of touch routing lines.

23. The touch display device of claim 15, wherein the second routing line portion includes a first portion being contacted to the corresponding touch electrode line and a second portion being physically separated from the first portion, and the second portion is electrically connected to the first portion through the second contact hole, the first routing line portion and a third contact hole.

* * * * *